United States Patent
Dai et al.

(10) Patent No.: US 9,001,707 B2
(45) Date of Patent: Apr. 7, 2015

(54) SIGNAL TRANSMISSION METHOD AND FRAME STRUCTURE ADOPTED IN A TDD SYSTEM

(75) Inventors: Bo Dai, Shenzhen (CN); Shuqiang Xia, Shenzhen (CN); Peng Hao, Shenzhen (CN); Chunli Liang, Shenzhen (CN); Guanghui Yu, Shenzhen (CN); Liujun Hu, Shenzhen (CN); Bin Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 691 days.

(21) Appl. No.: 12/674,336

(22) PCT Filed: Oct. 23, 2008

(86) PCT No.: PCT/CN2008/072801
§ 371 (c)(1),
(2), (4) Date: Feb. 19, 2010

(87) PCT Pub. No.: WO2009/056051
PCT Pub. Date: May 7, 2009

(65) Prior Publication Data
US 2011/0188414 A1     Aug. 4, 2011

(30) Foreign Application Priority Data

Oct. 28, 2007   (CN) .......................... 2007 1 0167739

(51) Int. Cl.
*H04J 3/00*     (2006.01)
*H04B 7/26*     (2006.01)
(Continued)

(52) U.S. Cl.
CPC ............. *H04B 7/2656* (2013.01); *H04W 48/12* (2013.01); *H04L 27/2602* (2013.01)

(58) Field of Classification Search
CPC .. H04B 7/2656; H04L 27/2602; H04W 48/12
USPC .................................................. 370/272–297
See application file for complete search history.

(56) References Cited

U.S. PATENT DOCUMENTS

2003/0117980 A1* 6/2003 Kim et al. ..................... 370/332
2005/0201319 A1   9/2005 Lee et al.
(Continued)

FOREIGN PATENT DOCUMENTS

| CN | 1436410 | 8/2003 |
| CN | 1917420 | 2/2007 |

(Continued)

OTHER PUBLICATIONS

International Search Report in international application No. PCT/CN2008/072801; mailed Feb. 5, 2009.
(Continued)

*Primary Examiner* — Xavier Szewai Wong
(74) *Attorney, Agent, or Firm* — Locke Lord LLP; Howard M. Gitten

(57) ABSTRACT

A signal transmission method in a Time Division Duplex (TDD) system is disclosed. The method comprises following steps: within a time length of a half-frame of a radio frame, base station transmits signal on a downlink special time slot, thereafter does not transmit signal on a Guard Period (GP), and then receives signal on an uplink special time slot; all time lengths of other uplink or downlink normal time slots for transmitting signal are equal; the total time length of the downlink special time slot, the guard period and the uplink special time slot is integer times of the time length of an uplink or downlink normal time slot. In addition, a frame structure adopted in the TDD system which corresponds to the method is disclosed. The present invention makes it flexible to set the duration of the GP and it is guaranteed that, even if a synchronization signal adopts power promotion, it will not bring great interference to uplink reception of other base stations; in addition, the utilization efficiency of the system is improved.

22 Claims, 15 Drawing Sheets

(51) Int. Cl.
*H04L 27/26* (2006.01)
*H04L 27/28* (2006.01)
*H04W 48/12* (2009.01)

(56) References Cited

U.S. PATENT DOCUMENTS

| | | | |
|---|---|---|---|
| 2008/0198775 A1* | 8/2008 | Nejatian | 370/280 |
| 2008/0310537 A1* | 12/2008 | Mukai | 375/260 |
| 2010/0027446 A1* | 2/2010 | Choi et al. | 370/280 |
| 2011/0002430 A1* | 1/2011 | Kim et al. | 375/362 |
| 2012/0106518 A1* | 5/2012 | Albert et al. | 370/336 |

FOREIGN PATENT DOCUMENTS

| | | |
|---|---|---|
| CN | 1960211 | 5/2007 |
| CN | 101005305 | 7/2007 |
| CN | 101159483 | 4/2008 |
| WO | WO-02082705 | 10/2002 |

OTHER PUBLICATIONS

International Search Report and Written Opinion of the International Searching Authority in International Application No. PCT/CN2008/072801, mailed Feb. 5, 2009.
Supplementary European Search Report Jul. 5, 2013.
Considerations on Gap Length Design for Gap-assisted E-UTRA Measurements for TDD FS2 Oct. 16, 2007.
Physical Channels and Modulation(Release 8) Aug. 19, 2007.
TDD Frame Structure Oct. 3, 2007.

* cited by examiner

SIGNAL TRANSMISSION METHOD AND FRAME STRUCTURE ADOPTED IN A TDD SYSTEM

CROSS REFERENCES TO RELATED APPLICATIONS

This application is a U.S. national phase application, pursuant to 35 U.S.C. §371, of PCT/CN2008/072801 filed on Oct. 23, 2008, which claims priority to Chinese Application No. 200710167739.1 filed Oct. 28, 2007. The entire contents of the aforementioned patent applications are incorporated herein by this reference.

TECHNICAL FIELD

The present invention relates to the field of mobile communications, more particularly, to a signal transmission method and a frame structure adopted in a Time Division Duplex (TDD) system.

BACKGROUND

FIG. 1 is a diagram illustrating the radio frame structure of a TDD system. In the diagram, a 10 ms radio frame includes two half-frames of the same length, and the length of each half-frame is 5 ms. Each half-frame further includes 7 normal time slots (also called subframes) and 3 special time slots which are a DwPTS, a GP and an UpPTS. The total length of the 3 special time slots DwPTS, GP and UpPTS is 275 us.

Wherein the length of the DwPTS time slot is approximately 83.333 us, a primary synchronization (P-SCH) signal is transmitted in the middle bandwidth of the time slot, and is mainly used for downlink synchronization. No data is transmitted in other bandwidth of the time slot;

The length of the GP time slot is 50 us, and the time slot is used for the protection of switching from a downlink time slot to an uplink time slot;

The length of the UpPTS time slot is approximately 141.67 us, an uplink random access signal is transmitted in the time slot and is mainly used in downlink synchronization.

Among the 7 normal time slots, the length of each time slot is 675 us, in order to simplify the system implementation, TS0 is always specified as a downlink time slot, and a secondary synchronization (S-SCH) signal used for downlink synchronization is transmitted in the middle bandwidth of the last symbol of the time slot. TS1 is always specified as an uplink time slot, and other 5 normal time slots, namely TS2~TS6, may be specified as an uplink time slot or a downlink time slot flexibly according to the service demand.

When a certain normal time slot is a downlink time slot, each time slot includes 8 or 9 symbols being transmitted by way of Orthogonal Frequency Division Multiplexing (OFDM) (the number of the symbols is related to cyclic prefixes of the symbols, when the cyclic prefix is a normal cyclic prefix, each time slot includes 9 symbols, and when the cyclic prefix is an extended cyclic prefix, each time slot includes 8 symbols). In the time slot, downlink control channel is usually located in the first several symbols thereof, and downlink shared channel for transmitting normal user data is located in the last several symbols of the time slot.

When a certain normal time slot is an uplink time slot, each time slot includes 8 or 9 symbols which are transmitted by way of single-carrier. (the number of the symbols is related to cyclic prefixes of the symbols, when the cyclic prefix is a normal cyclic prefix, each time slot includes 9 symbols, and when the cyclic prefix is an extended cyclic prefix, each time slot includes 8 symbols). In the time slot, uplink control channel is usually located on both sides of the system bandwidth, and the duration is one time slot; while uplink shared channel for transmitting user normal data is located in the remaining position of the system bandwidth, and the duration is also one time slot.

The frame structure of the TDD system is similar with that of the current TD-SCDMA system. When the TDD system coexists with the current TD-SCDMA system at adjacent frequencies, if only the proportion of switching between uplink time slots and downlink time slots being set by the TDD system is the same as that of the TD-SCDMA system, then the mutual interference between the TDD system and the TD-SCDMA system may be avoided effectively.

However, there are several problems in the above-mentioned TDD system as listed bellow:

The setting of the GP is very inflexible. In this system, the length of the GP time slot is 50 us, when the system is required to support wider coverage, the length of the GP must be extended. Methods for extending the GP can be to reserve the UpPTS time slot as the GP time slot, or to reserve the UpPTS time slot and the TS1 as the GP time slot (wherein part of TS1 symbols can not be reserved as the GP because an uplink control channel is usually located on two sides of the system bandwidth, and the duration is one time slot; if part of TS1 symbols are reserved as the GP, the reception of the uplink control channel will be greatly degraded, nor should part of the ISO symbols be reserved as the GP, because the P-SCH/S-SCH signals are transmitted in the last two symbols of TS0, if part of the TS0 symbols are reserved as the GP, the user may be unable to receive the P/S-SCH signals, which are the signals a user has to receive first before accessing the system, and if a user cannot receive the P/S-SCH signals correctly, nor can the user access the system).

The P/S-SCH signals are located at the border of the switch from the downlink time slot to the uplink time slot, as illustrated above, the P/S-SCH signals are the signals a user has to receive first before accessing the system, therefore, the power of the P/S-SCH signals are usually higher than other signals, in a cellular environment, because of the high power of the P/S-SCH signals, the reception of an uplink time slot signal will be severely impacted.

The utilization efficiency of the DwPTS time slot is not high. When the system bandwidth is wide, since there is only the P-SCH signal transmitted in the middle bandwidth (1.25 MHz) of the system bandwidth, the utilization efficiency of the DwPTS time slot is very low.

Therefore, it is necessary to provide a new method for transmitting signals in a TDD system, by which not only the signals transmitted can coexist with an existing TD-SCDMA system at adjacent frequencies, but also the above-mentioned problems can be solved.

SUMMARY

The technical problem the present invention aiming to solve is to provide a signal transmission method and a frame structure adopted in a TDD system, so that the TDD system can coexist with an existing TD-SCDMA system at adjacent frequencies, the utilization efficiency of system resources can be increased, the interference to uplink reception of other base stations can be reduced, and the setting of a GP can be more flexibly.

To solve the above problems, the present invention discloses a signal transmission method in a TDD system, within the time length of a half-frame of a radio frame, a base station transmits signals in a downlink special time slot, thereafter does not transmit signals in a guard period (GP), and then receives signals in an uplink special time slot; all time lengths of other uplink or downlink normal time slots for transmitting signals are equal; the total time length of the downlink special time slot, the guard period and the uplink special time slot is integer times of the time length of an uplink or downlink normal time slot.

Further, in the above method:

A primary synchronization (P-SCH) signal is transmitted in the first symbol of the downlink special time slot, and a secondary synchronization (S-SCH) signal is transmitted in the last symbol of the previous downlink time slot adjacent to the downlink special time slot; or the P-SCH signal and the S-SCH signal are transmitted in the first two symbols of the downlink special time slot; or the P-SCH signal and the S-SCH signal are transmitted in the last two symbols of the first downlink time slot in the half-frame.

Further, in the above method:

an uplink random access signal is transmitted in one or more consecutive time slots in the uplink special time slot and the uplink normal time slot.

When a short random access channel (RACH) is adopted, the uplink random access signal is transmitted in the first two symbols of the uplink special time slot, or in the last two symbols of the uplink special time slot, or in start positions of other uplink time slots.

Further, in the above method:

in the base station, the time length of the downlink special time slot, that of the guard period and that of the uplink special time slot are set according to practical application occasions, on the occasion when it is required to support larger coverage, the GP may occupy part of the time length of the downlink special time slot and that of the uplink special time slot to increase the length of itself, wherein growth granularity of the time length of the GP is symbol level, namely the time length of the GP being set is longer than that under the occasion which is only required to support a smaller coverage.

Further, in the above method:

the number of the uplink and downlink normal time slots in the half-frame is 4, and the total time length of the downlink special time slot, the GP and the uplink special time slot is 1 or 2 times of the time length of one normal time slot; or the number of the uplink and downlink normal time slots in the half-frame is 5, and the total time length of the downlink special time slot, the GP and the uplink special time slot is 1 or 2 times of the time length of one normal time slot; or the number of the uplink and downlink normal time slots in the half-frame is 6, and the total time length of the downlink special time slot, the GP and the uplink special time slot is 1 or 2 times of the time length of one normal time slot; or the number of the uplink and downlink normal time slots in the half-frame is 7, and the total time length of the downlink special time slot, the GP and the uplink special time slot is 1 or 2 times of the time length of one normal time slot; or the number of the uplink and downlink normal time slots in the half-frame is 8, and the total time length of the downlink special time slot, the GP and the uplink special time slot is 1 or 2 times of the time length of one normal time slot; or the number of the uplink and downlink normal time slots in the half-frame is 9, and the total time length of the downlink special time slot, the GP and the uplink special time slot is 1 or 3 times of the time length of one normal time slot; or the number of the uplink and downlink normal time slots in the half-frame is 10, and the total time length of the downlink special time slot, the GP and the uplink special time slot is 2 times of the time length of one normal time slot; or the number of the uplink and downlink normal time slots in the half-frame is 11, and the total time length of the downlink special time slot, the GP and the uplink special time slot is 1 time of the time length of one normal time slot; or the number of the uplink and downlink normal time slots in the half-frame is 12, and the total time length of the downlink special time slot, the GP and the uplink special time slot is 3 times of the time length of one normal time slot; or the number of the uplink and downlink normal time slots in the half-frame is 13, and the total time length of the downlink special time slot, the GP and the uplink special time slot is 2 times of the time length of one normal time slot; or the number of the uplink and downlink normal time slots in the half-frame is 14, and the total time length of the downlink special time slot, the GP and the uplink special time slot is 1 time of the time length of one normal time slot.

Further, in the above method, within the time length of the half-frame, the base station transmits signals in order in the first downlink normal time slot, in the second downlink normal time slot and in the downlink special time slot, then doesn't transmit signals in the GP, and then receives signals in the uplink special time slot, receives or transmits signals in the remaining 6 time slots according to uplink and downlink setting, and the total time length of the downlink special time slot, the GP and the uplink special time slot is 2 times of the time length of one normal time slot.

When the TDD system that applies the transmission method above coexists with a TD-SCDMA system, if the proportion of downlink time slots and uplink time slots of the TD-SCDMA system is 2:5, then:

if a normal cyclic prefix is adopted, the downlink special time slot includes 5 downlink symbols, and the time length is $T_{DL}=356.8$ us; the time length of the GP is $T_{GP}=142.72$ us; the uplink special time slot includes 7 uplink symbols, and the time length is $T_{UL}=499.52$ us;

if an extended cyclic prefix is adopted, the downlink special time slot includes 5 downlink symbols, and the time length is $T_{DL}=417.6$ us; the time length of the GP is $T_{GP}=83.34$ us; the uplink special time slot includes 6 uplink symbols, and the time length is $T_{UL}=500.04$ us;

if the proportion of downlink time slots and uplink time slots of the TD-SCDMA system is 3:4, then:

if a normal cyclic prefix is adopted, the downlink special time slot includes 1 downlink symbol, and the time length is $T_{DL}=71.36$ us; the time length of the GP is $T_{GP}=142.72$ us; the uplink special time slot includes 11 uplink symbols, and the time length is $T_{UL}=784.96$ us;

if an extended cyclic prefix is adopted, the downlink special time slot includes 1 downlink symbol, and the time length is $T_{DL}=83.34$ us; the time length of the GP is $T_{GP}=166.68$ us; the uplink special time slot includes 9 uplink symbols, and the time length is $T_{UL}=750.06$ us;

if the proportion of downlink time slots and uplink time slots of the TD-SCDMA system is 4:3, then:

if a normal cyclic prefix is adopted, the downlink special time slot includes 10 downlink symbols, and the time length is $T_{DL}=713.6$ us; the time length of the GP is $T_{GP}=142.72$ us; the uplink special time slot includes 2 uplink symbols, and the time length is $T_{UL}=142.72$ us;

if an extended cyclic prefix is adopted, the downlink special time slot includes 9 downlink symbols, and the time length is $T_{DL}=750.06$ us; the time length of the GP is $T_{GP}=83.34$ us; the uplink special time slot includes 2 uplink symbols, and the time length is $T_{UL}=166.68$ us;

if the proportion of downlink time slots and uplink time slots of the TD-SCDMA system is 5:2, then;

if a normal cyclic prefix is adopted, the downlink special time slot includes 6 downlink symbols, and the time length is $T_{DL}$=428.64 us; the time length of the GP is $T_{GP}$=142.72 us; the uplink special time slot includes 6 uplink symbols, and the time length is $T_{UL}$=428.64 us;

if an extended cyclic prefix is adopted, the downlink special time slot includes 5 downlink symbols, and the time length is $T_{DL}$=417.6 us; the time length of the GP is $T_{GP}$=166.68 us; the uplink special time slot includes 5 uplink symbols, and the time length is $T_{UL}$=417.6 us;

if the proportion of downlink time slots and uplink time slots of the TD-SCDMA system is 6:1, then:

if a normal cyclic prefix is adopted, the downlink special time slot includes 1 downlink symbol, and the time length is $T_{DL}$=71.36 us; the time length of the GP is $T_{GP}$=142.72 us; the uplink special time slot includes 11 uplink symbols, and the time length is $T_{UL}$=784.96 us;

if an extended cyclic prefix is adopted, the downlink special time slot includes 1 downlink symbol, and the time length is $T_{DL}$=83.34 us; the time length of the GP is $T_{GP}$=166.68 us; the uplink special time slot includes 9 uplink symbols, and the time length is $T_{UL}$=750.06 us;

or the parameter settings of the downlink special time slot, the GP and the uplink special time slot according to the above-mentioned various proportions may be applied when the TDD system and the TD-SCDMA system do not coexist.

When the TDD system that applies the transmission method does not coexist with the TD-SCDMA system:

if a normal cyclic prefix is adopted, the downlink special time slot includes 1 downlink symbol, of which the time length is $T_{DL}$=71 us; the time length of the GP is $T_{GP}$=929 us, equaling to the time length of 13 symbols; the time length of the uplink special time slot is $T_{UL}$=0 us; or if an extended cyclic prefix is adopted, the downlink special time slot includes 1 downlink symbol, of which the time length is $T_{DL}$=83 us the time length of the GP is $T_{GP}$=91.7 us, equaling to the time length of 11 symbols; the time length of the uplink special time slot is $T_{UL}$=0 us;

the total time length of the downlink special time slot and the GP equals to the time length of two normal time slots under both the above two circumstances, and the uplink random access signal is transmitted in one or more consecutive uplink normal time slots.

The symbols that are included in the uplink time slot and/or downlink time slot are Orthogonal Frequency Division Multiplexing (OFDM) symbols.

The present invention also discloses a frame structure adopted in the TDD system, wherein a radio frame includes two half-frames of equal length, and each half-frame includes one downlink special time slot, one guard period (GP), one uplink special time slot, and a plurality of uplink and downlink normal time slots of equal length, and the total time length of the downlink special time slot, the guard period and the uplink special time slot is integer times of the time length of one uplink or downlink normal time slot.

In the above frame structure:

when the number of the uplink and downlink normal time slots in the half-frame is 4, and the total time length of the downlink special time slot, the GP and the uplink special time slot is 1 or 2 times of the time length of one normal time slot; or when the number of the uplink and downlink normal time slots in the half-frame is 5, and the total time length of the downlink special time slot, the GP and the uplink special time slot is 1 or 2 times of the time length of one normal time slot; or when the number of the uplink and downlink normal time slots in the half-frame is 6, and the total time length of the downlink special time slot, the GP and the uplink special time slot is 1 or 2 times of the time length of one normal time slot; or when the number of the uplink and downlink normal time slots in the half-frame is 7, and the total time length of the downlink special time slot, the GP and the uplink special time slot is 1 or 2 times of the time length of one normal time slot; or when the number of the uplink and downlink normal time slots in the half-frame is 8, and the total time length of the downlink special time slot, the GP and the uplink special time slot is 1 or 2 times of the time length of one normal time slot; or when the number of the uplink and downlink normal time slots in the half-frame is 9, and the total time length of the downlink special time slot, the GP and the uplink special time slot is 1 or 3 times of the time length of one normal time slot; or when the number of the uplink and downlink normal time slots in the half-frame is 10, and the total time length of the downlink special time slot, the GP and the uplink special time slot is 2 times of the time length of one normal time slot; or when the number of the uplink and downlink normal time slots in the half-frame is 11, and the total time length of the downlink special time slot, the GP and the uplink special time slot is 1 time of the time length of one normal time slot; or when the number of the uplink and downlink normal time slots in the half-frame is 12, and the total time length of the downlink special time slot, the GP and the uplink special time slot is 3 times of the time length of one normal time slot; or when the number of the uplink and downlink normal time slots in the half-frame is 13, and the total time length of the downlink special time slot, the GP and the uplink special time slot is 2 times of the time length of one normal time slot; or when the number of the uplink and downlink normal time slots in the half-frame is 14, and the total time length of the downlink special time slot, the GP and the uplink special time slot is 1 time of the time length of one normal time slot.

Further, in the above-described radio frame structure, the half-frame includes two downlink normal time slots, one downlink special time slot, one GP, one uplink special time slot, and 6 uplink and/or downlink normal time slots in sequence, and the total time length of the downlink special time slot, the GP and the uplink special time slot is 2 times of the time length of one normal time slot.

Further, in the above-described radio frame structure, when the downlink special time slot and the uplink special time slot adopt a normal cyclic prefix, the downlink special time slot includes 5 downlink symbols, and the time length is $T_{DL}$=356.8 us; the GP includes 2 symbols, and the time length is $T_{GP}$=142.72 us; the uplink special time slot includes 7 uplink symbols, and the time length is $T_{UL}$=49952 us; or when the downlink special time slot and the uplink special time slot adopt an extended cyclic prefix, the downlink special time slot includes 5 downlink symbols, and the time length is $T_{DL}$=417.6 us; the GP includes 1 symbol, and the time length is $T_{GP}$=83.34 us; the uplink special time slot includes 6 uplink symbols, and the time length is $T_{UL}$=500.04 us; or when the downlink special time slot and the uplink special time slot adopt a normal cyclic prefix, the downlink special time slot includes 1 downlink symbol, and the time length is $T_{DL}$=71.36 us; the GP includes 2 symbols, and the time length is $T_{GP}$=142.72 us; the uplink special time slot includes 11 uplink symbols, and the time length is $T_{UL}$=784.96 us; or when the downlink special time slot and the uplink special time slot adopt an extended cyclic prefix, the downlink special time slot includes 1 downlink symbol, and the time length is $T_{DL}$=83.34 us; the GP includes 2 symbols, and the time length is $T_{GP}$=166.68 us; the uplink special time slot includes 9 uplink symbols, and the time length is $T_{UL}$=750.06 us; or when the downlink special time slot and the uplink special time slot adopt a normal cyclic prefix, the downlink special time slot includes 10 downlink symbols, and the time length is $T_{DL}$=713.6 us; the GP includes 2 symbols, and the time length is $T_{GP}$=142.72 us; the uplink special time slot includes 2 uplink symbols, and the time length is $T_{UL}$=142.72 us; or when the downlink special time slot and the uplink special time slot adopt an extended cyclic prefix, the downlink special time slot includes 9 downlink symbols, and the time length is $T_{DL}$=750.06 us; the GP includes 1 symbol, and the time length is $T_{GP}$=83.34 us; the uplink special time slot includes 2 uplink symbols, and the time length is $T_{UL}$=166.68 us; or when the downlink special time slot and the uplink special time slot adopt a normal cyclic prefix, the downlink special time slot includes 6 downlink symbols, and the time length is $T_{DL}$=4128.64 us; the GP includes 2 symbols, and the time length is $T_{GP}$=142.72 us; the uplink special time slot includes 6 uplink symbols, and the time length is $T_{UL}$=428.64 us; or when the downlink special time slot and the uplink special time slot adopt an extended cyclic prefix, the downlink special time slot includes 5 downlink symbols, and the time length is $T_{DL}$=417.6 us; the GP includes 2 symbols, and the time length is $T_{GP}$=166.68 us; the uplink special time slot includes 5 uplink symbols, and the time length is $T_{UL}$=417.6 us; or when the downlink special time slot and the uplink special time slot adopt a normal cyclic prefix, the downlink special time slot includes 1 downlink symbol, and the time length $T_{DL}$=71.36 us; the GP includes 2 symbols, and the time length is $T_{GP}$=142.72 us; the uplink special time slot includes 11 uplink symbols, and the time length is $T_{UL}$=784.96 us; or when the downlink special time slot and the uplink special time slot adopt an extended cyclic prefix, the downlink special time slot includes 1 downlink symbol, and the time length $T_{DL}$=83.34 us, the GP includes 2 symbols, and the time length is $T_{GP}$=166.68 us; the uplink special time slot includes 9 uplink symbols, and the time length is $T_{UL}$=750.06 us.

As to the 6 normal time slots following the uplink special time slot, 2 or 4 uplink normal time slots are set first, and then one uplink-downlink switch point is set, and then 4 or 2 downlink normal time slots are set; or the 6 normal time slots following the uplink special time slot are all set to be uplink normal time slots.

Further, in the above-described radio frame structure, a primary synchronization (P-SCH) signal is transmitted in the first symbol of the downlink special time slot, while a secondary synchronization (S-SCH) signal is transmitted in the last symbol of the downlink time slot that is adjacent to the downlink special time slot, or the P-SCH signal and the S-SCH signal are transmitted in the first two symbols of the downlink special time slot, or the P-SCH signal and the S-SCH signal are transmitted in the last two symbols of the first downlink time slot.

Further, in the above-described radio frame structure, an uplink random access signal is transmitted in one of the uplink special time slots and the uplink normal time slots or in more consecutive time slots thereof, when a short random access channel (RACH) is adopted, the uplink random access signal is transmitted in the first two symbols of the uplink special time slot, or in the last two symbols of the uplink special time slot, or in start positions of other uplink time slots.

In the above-described radio frame structure, the symbols included in the uplink time slot and/or downlink time slot are Orthogonal Frequency Division Multiplexing (OFDM) symbols.

By adopting the signal transmission method and the frame structure adopted in a TDD system described in the present invention, the coexistence of a TDD system and an existing TD-SCDMA system at adjacent frequencies can be realized, the utilization efficiency of system resources can be increased, the interference to uplink reception of other base stations can be reduced, and a GP can be set more flexibly.

DETAILED DESCRIPTION

Figure 1:
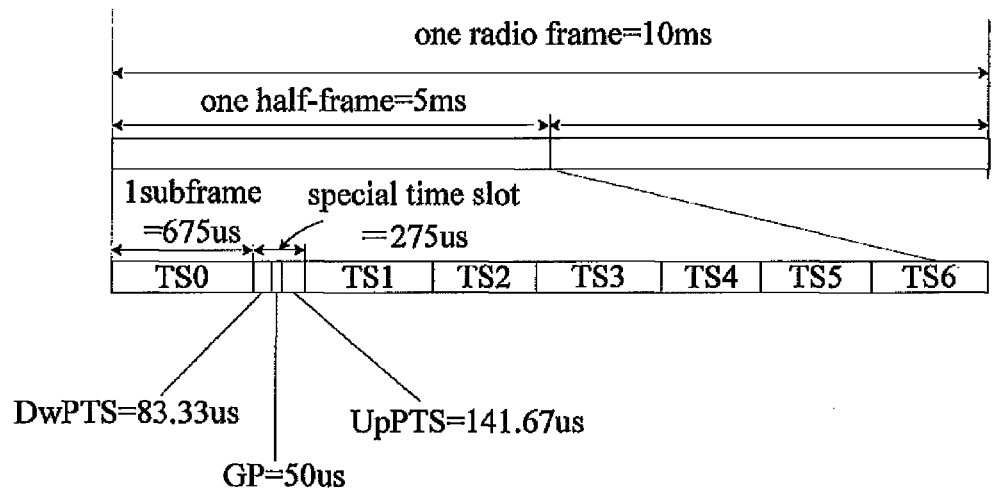
FIG. 1 is a diagram illustrating the structure of a radio frame while signals are transmitted in an existing TDD system.

In the present invention, a 10 ms radio frame is divided into two half-frames of equal length of 5 ms, and a half-frame is further divided into n time slots of equal length, which are denoted as $TS_0 \sim TS_{n-1}$ the duration of each time slot is $T_{slot}$. Among the time slots, K consecutive time slots $TS_i \sim TS_{i+k-1}$ are selected and combined, being taken as a downlink special time slot, a guard period (GP) and an uplink special time slot, whose durations, i.e. time lengths, are denoted as $T_{DL}$, $T_{GP}$ and $T^{UL}$ respectively. As to a radio frame with such structure, each half-frame thereof includes one downlink special time slot, one guard period GP, one uplink special time slot and a plurality of uplink and downlink normal time slots of equal length, the total time length of the downlink special time slot, the GP and the uplink special time slot is integer times of the time length of one uplink or downlink normal time slot.

$$n \times T_{slot} = 5 \text{ ms}$$

$$T_{DL} + T_{GP} + T_{DL} = T_{slot} \times k$$

In the formula, $T_{DL}$ denotes the time length for transmitting the downlink special time slot, $T_{UL}$ denotes the time length for transmitting the uplink special time slot, and $T_{GP}$ denotes the time length of the GP used for uplink and downlink switch.

According to different situations, the time length of the downlink special time slot $T_{DL}$, or that of the GP $T_{GP}$ or that of the uplink special time slot $T_{UL}$ may be adjusted when the constraints listed below are satisfied:

(1) the $T_{GP}$ is set between the $T_{DL}$ and the $T_{UL}$, and the $T_{DL}$ is set before the $T_{UL}$;

(2) a primary synchronization (P-SCH) signal is transmitted in the first OFDM symbol of the downlink special time slot, a secondary synchronization (S-SCH) signal is transmitted in the last OFDM symbol of the downlink time slot which is adjacent to the downlink special time slot, or the P-SCH signal and the S-SCH signal are transmitted in the first two OFDM symbols of the downlink special time slot, or the P-SCH signal and the S-SCH signal are transmitted in the last two symbols of the first downlink time slot;

(3) an uplink random access signal is transmitted in the uplink special time slot and one or more consecutive time slots among $TS_{i+k} \sim TS_{n-1}$, when a short random channel RACH is adopted, the uplink random access signal is transmitted in the first two OFDM symbols of the uplink special time slot, or is transmitted in the last two OFDM symbols of the uplink special time slot, or is transmitted in start positions of other uplink time slots;

(4) the GP may extend the length of itself to support wider coverage by occupying the downlink and uplink special time slots. Wherein, the growth granularity of the time length of the GP is symbol level.

Accordingly, the signal transmission method of this invention is as follows: within a time length of a half-frame of a radio frame, after transmitting signals in a downlink special time slot, a base station does not transmit signals in a guard period (GP), then the base station receives signals in an uplink special time slot. The time lengths of other uplink or downlink normal time slots for transmitting signals are equal, and the total time length of the downlink special time slot, the guard period and the uplink special time slot is integer times of the time length of one uplink or downlink normal time slot.

The technical scheme adopted in the present invention will be further described in detail with reference to the drawings and embodiments hereinafter.

Figure 2:
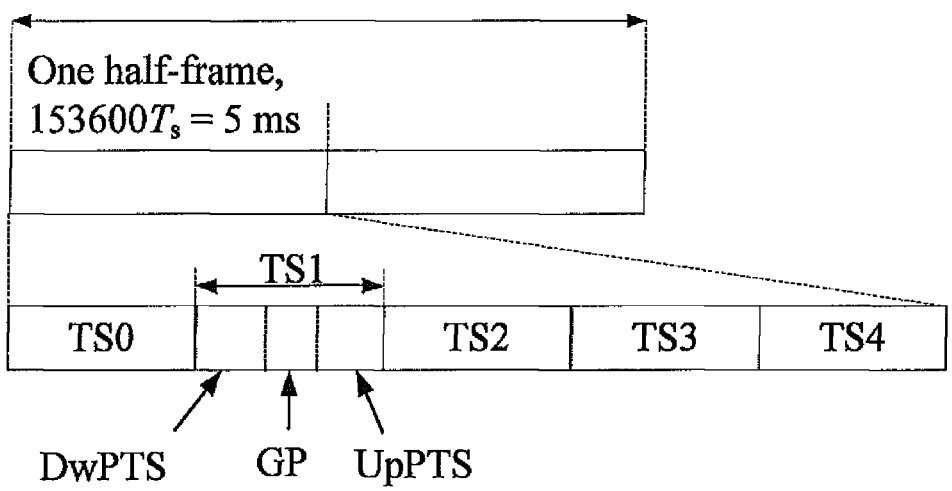
FIG. 2 is a diagram illustrating the structure of a radio frame that is transmitted by adopting the method of the present invention when n is 5.

When n is 5, the 5 ms half-frame is divided into 5 time slots of equal length, and each time slot lasts for 1000 us, being denoted as $TS_0 \sim TS_4$ respectively, and then one of the time slots thereof is taken as the downlink special time slot, the GP and the uplink special time slot, while others are taken as uplink or downlink normal time slots;

the time slots can be configured with reference to FIG. 2, wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 3A:
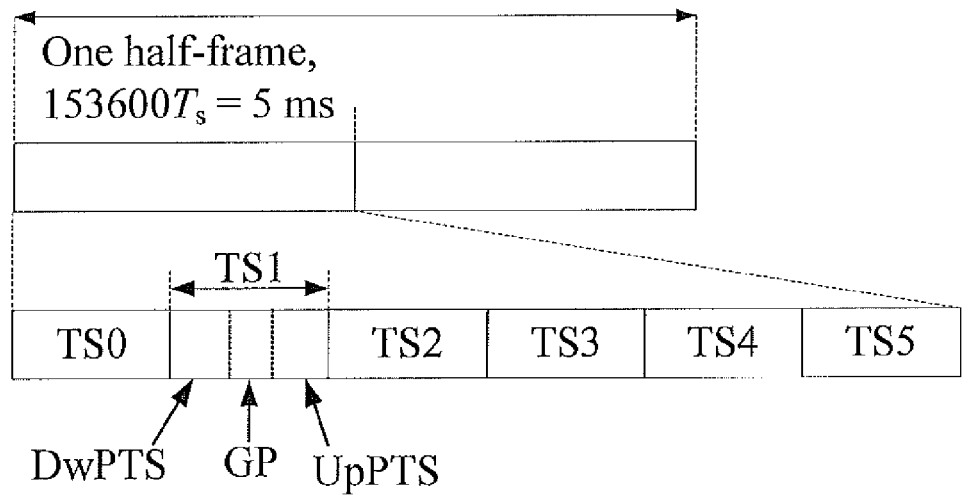
FIG. 3(a) is a diagram illustrating the structure of the first radio frame that is transmitted by adopting the method of the present invention when n is 6.

When n is 6, the 5 ms half-frame is divided into 6 time slots of equal length, and each time slot lasts for 833.33 us, being denoted as $TS_0 \sim TS_5$ respectively, and then one of the time slots thereof is taken as the downlink special time slot, the GP and the uplink special time slot, or two consecutive time slots are taken as the downlink special time slot, the GP and the uplink special time slot;

the time slots thereof can be configured with reference to FIG. 3(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 3B:
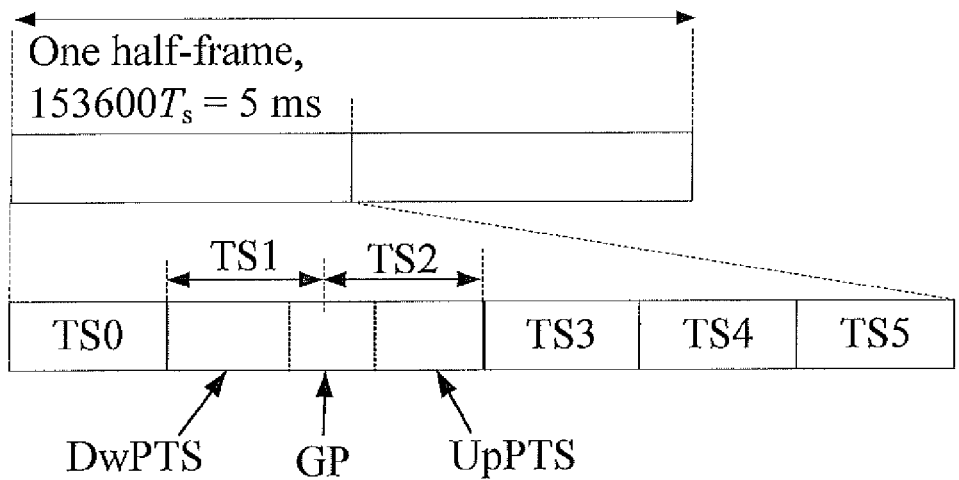
FIG. 3(b) is a diagram illustrating the structure of the second radio frame that is transmitted by adopting the method of the present invention when n is 6.

Or the time slots can be configured with reference to FIG. 3(b), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 4A:
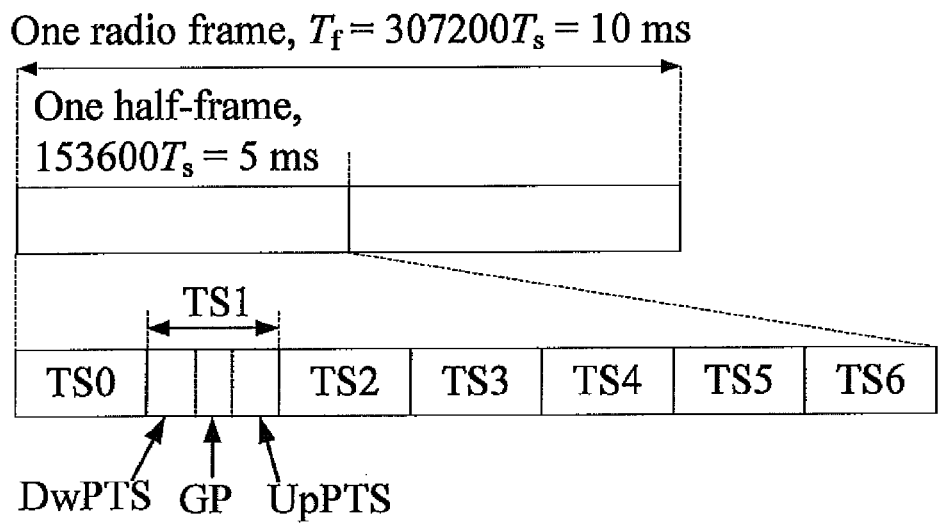
FIG. 4(a) is a diagram illustrating the structure of the first radio frame that is transmitted by adopting the method of the present invention when n is 7.

When n is 7, the 5 ms half-frame is divided into 7 time slots of equal length, and each time slot lasts for 714.29 us, being denoted as $TS_0$~$TS_6$ respectively, and then one of the time slots thereof is taken as the downlink special time slot, the GP and the uplink special time slot, or two consecutive time slots are taken as the downlink special time slot, the GP and the uplink special time slot;

the time slots thereof can be configured with reference to FIG. 4(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 4B:
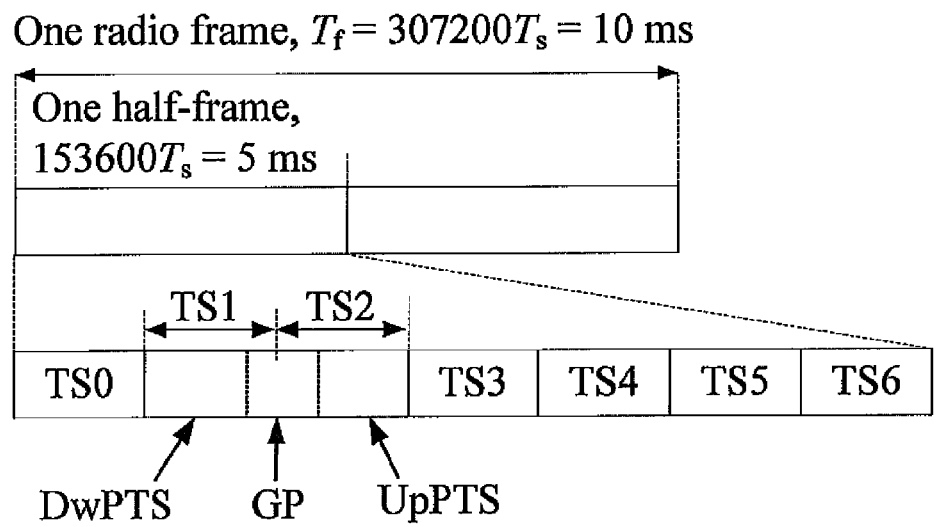
FIG. 4(b) is a diagram illustrating the structure of the second radio frame that is transmitted by adopting the method of the present invention when n is 7.

Or the time slots can be configured with reference to FIG. 4(b), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 5A:
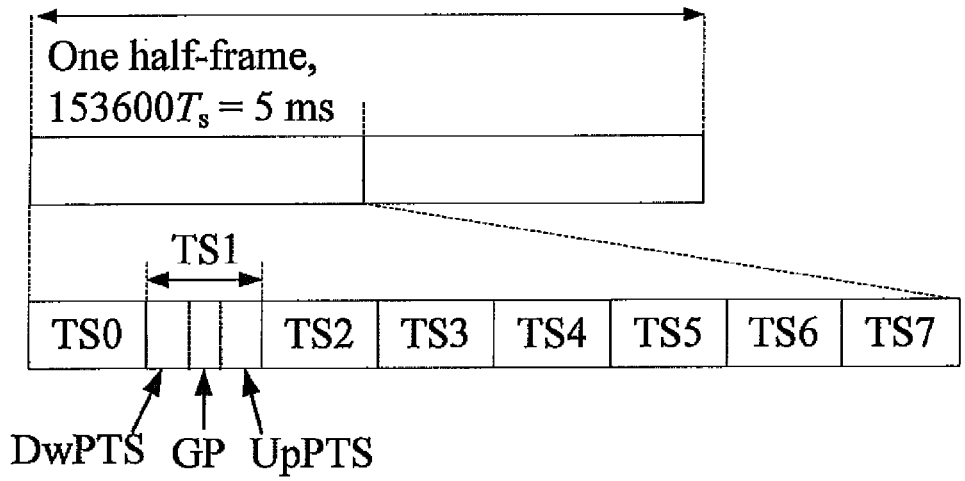
FIG. 5(a) is a diagram illustrating the structure of the first radio frame that is transmitted by adopting the method of the present invention when n is 8.

When n is 8, the 5 ms half-frame is divided into 8 time slots of equal length, and each time slot lasts for 623 us, being denoted as $TS_0$~$TS_7$ respectively, and then one of the time slots thereof is taken as the downlink special time slot, the GP and the uplink special time slot, or two consecutive time slots are taken as the downlink special time slot, the GP and the uplink special time slot;

the time slots thereof can be configured with reference to FIG. 5(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 5B:
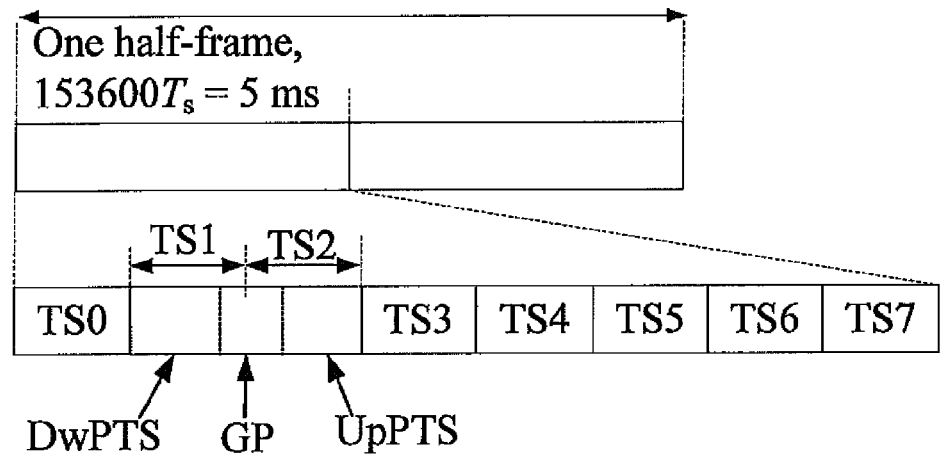
FIG. 5(b) is a diagram illustrating the structure of the second radio frame that is transmitted by adopting the method of the present invention when n is 8.

Or the time slots can be configured with reference to FIG. 5(b), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 6A:
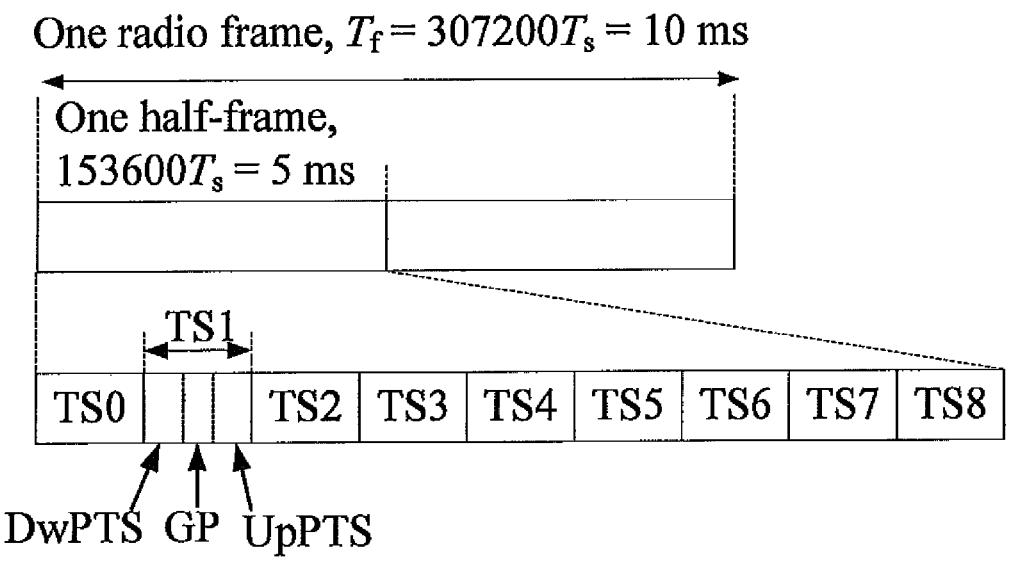
FIG. 6(a) is a diagram illustrating the structure of the first radio frame that is transmitted by adopting the method of the present invention when n is 9.

When n is 9, the 5 ms half-frame is divided into 9 time slots of equal length, and each time slot lasts for 623 us, being denoted as $TS_0$~$TS_6$ respectively, and then one of the time slots thereof is taken as the downlink special time slot, the GP and the uplink special time slot, or two consecutive time slots are taken as the downlink special time slot, the GP and the uplink special time slot;

the time slots thereof can be configured with reference to FIG. 6(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 6B:
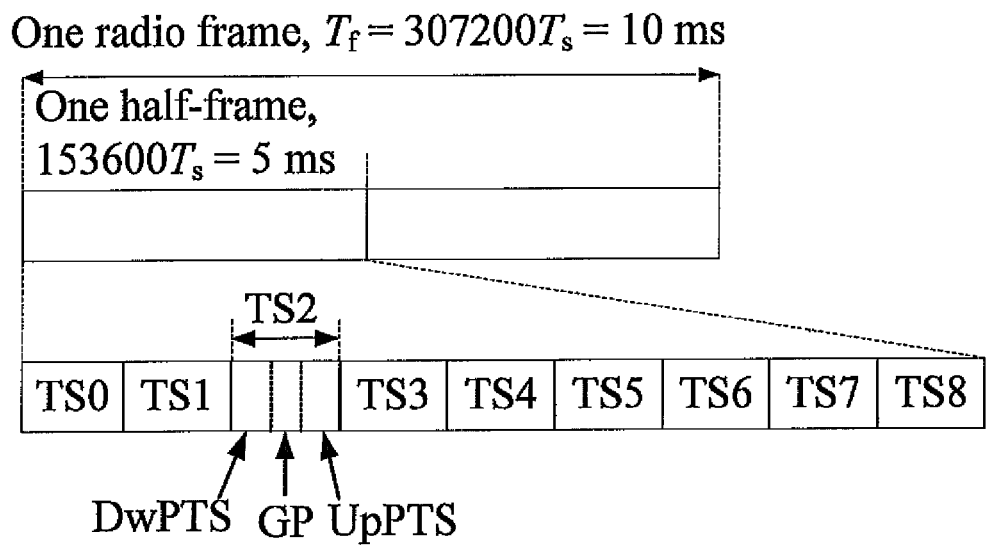
FIG. 6(b) is a diagram illustrating the structure of the second radio frame that is transmitted by adopting the method of the present invention when n is 9.

Or the time slots can be configured with reference to FIG. 6(b), wherein the first and second time slots are taken as downlink time slots, and the one afterwards is taken as the downlink special time slot, the GP and the uplink special time slot (these three parts occupy the time length of one normal time slot), and other normal time slots are set according to the switch point position.

Figure 6C:
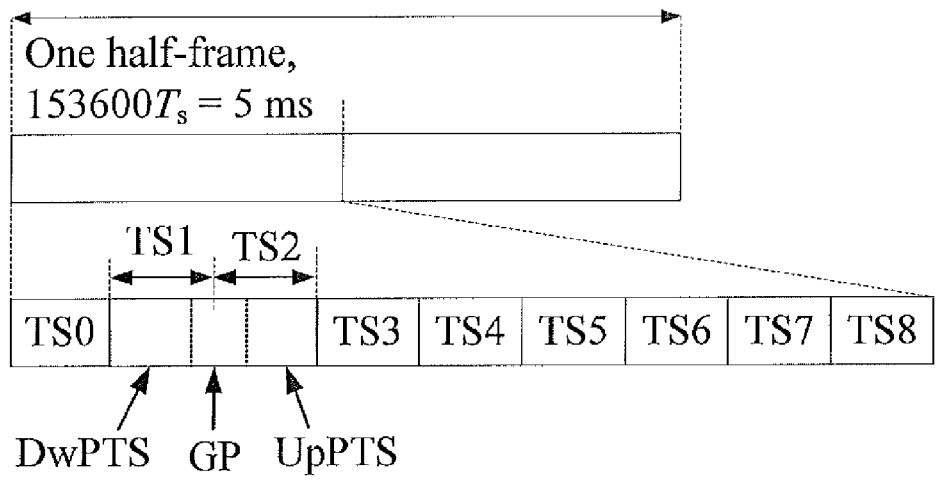
FIG. 6(c) is a diagram illustrating the structure of the third radio frame that is transmitted by adopting the method of the present invention when n is 9.

Or the time slots can be configured with reference to FIG. 6(c), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 6D:
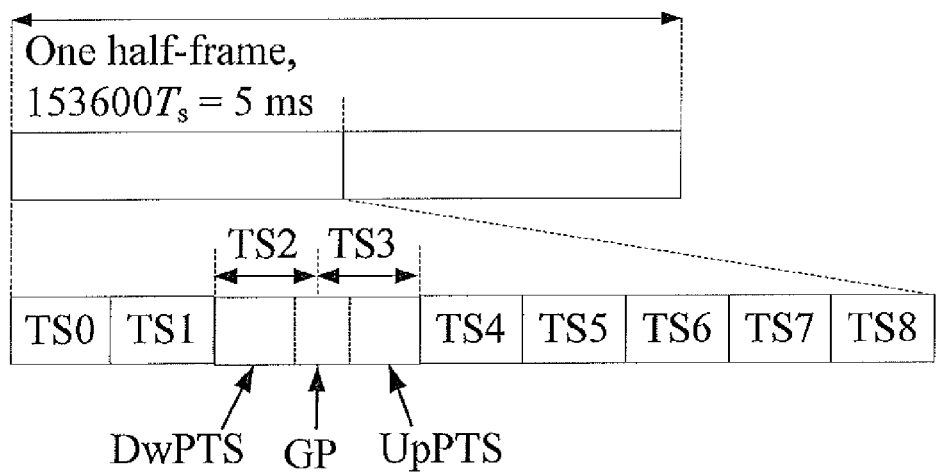
FIG. 6(d) is a diagram illustrating the structure of the fourth radio frame that is transmitted by adopting the method of the present invention when n is 9.

Or the time slots can be configured with reference to FIG. 6(d), wherein the first and second time slots are taken as downlink time slots, and the two afterwards are taken as the downlink special time slot, the GP and the uplink special time slot (these three parts occupy the time length of the third time slot and that of the fourth time slot), and other normal time slots are set according to the switch point position.

Figure 7A:
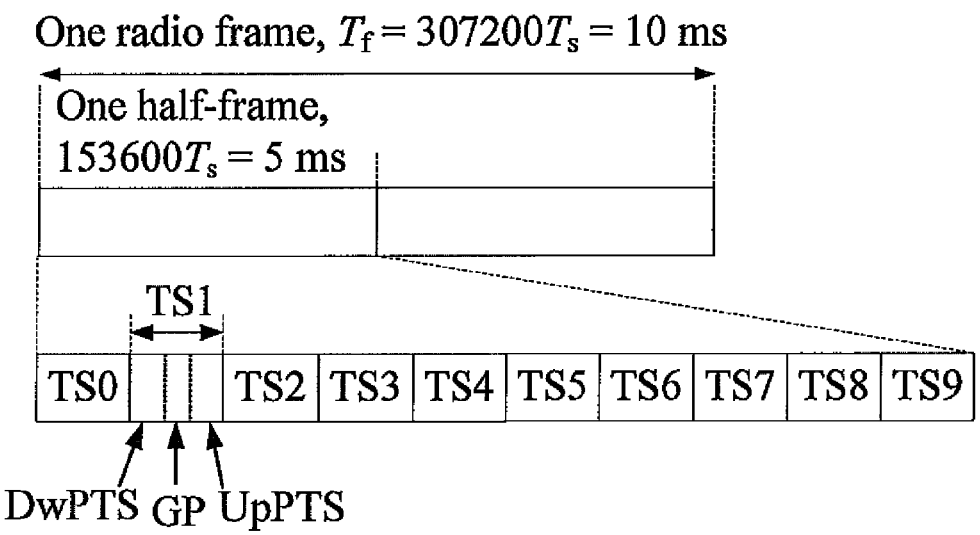
FIG. 7(a) is a diagram illustrating the structure of the first radio frame that is transmitted by adopting the method of the present invention when n is 10.

When n is 10, the 5 ms half-frame is divided into 10 time slots of equal length, and each time slot lasts for 500 us, being denoted as $TS_0$~$TS_9$ respectively, and then one of the time slots thereof is taken as the downlink special time slot, the GP and the uplink special time slot, or two consecutive time slots are taken as a downlink special time slot, the GP and the uplink special time slot;

the time slots thereof can be configured with reference to FIG. 7(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 7B:
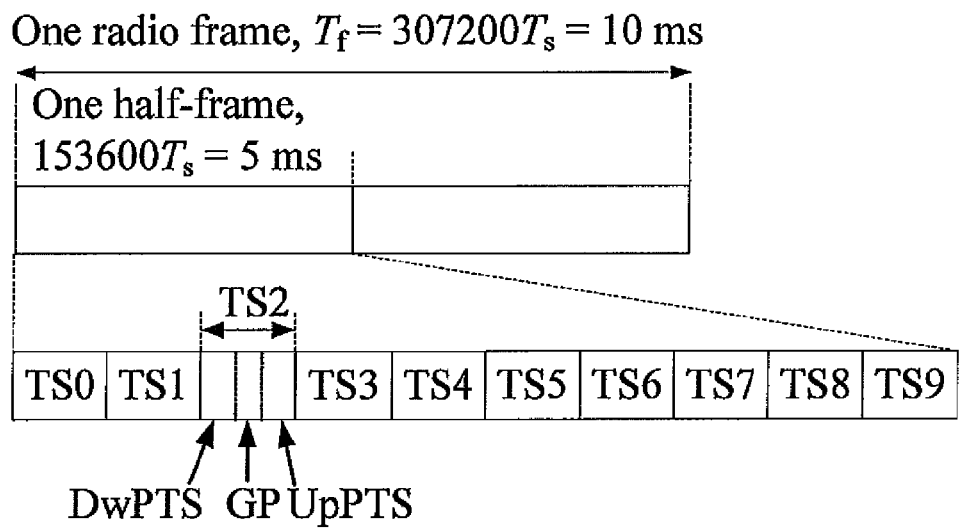
FIG. 7(b) is a diagram illustrating the structure of the second radio frame that is transmitted by adopting the method of the present invention when n is 10.

Or the time slots can be configured with reference to FIG. 7(b), wherein the first and second time slots are taken as downlink time slots, and the one afterwards is taken as the downlink special time slot, the GP and the uplink special time slot (these three parts occupy the time length of one normal time slot), and other normal time slots are set according to the switch point position.

Figure 7C:
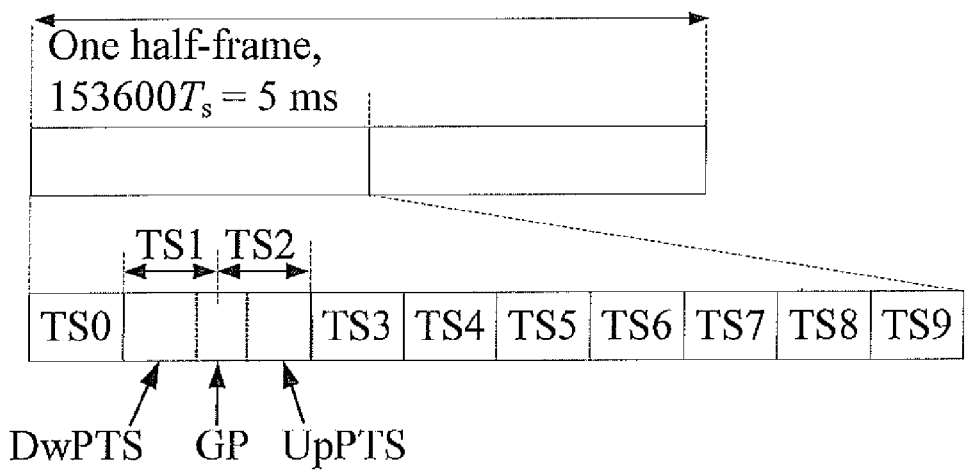
FIG. 7(c) is a diagram illustrating the structure of the third radio frame that is transmitted by adopting the method of the present invention when n is 10.

Or the time slots can be configured with reference to FIG. 7(c), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 7D:
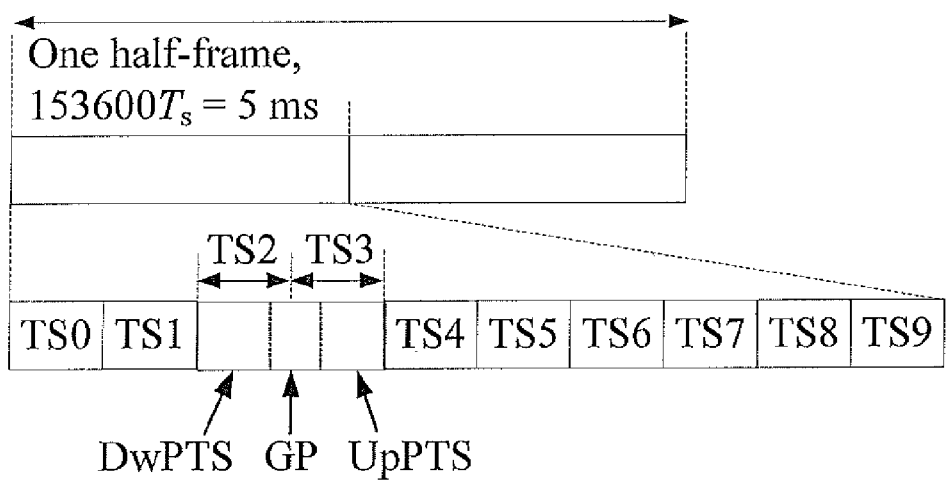
FIG. 7(d) is a diagram illustrating the structure of the fourth radio frame that is transmitted by adopting the method of the present invention when n is 10.

Or the time slots can be configured with reference to FIG. 7(d), wherein the first and second time slots are taken as downlink time slots, and the two afterwards are taken as the downlink special time slot, the GP and the uplink special time slot (these three parts occupy the time length of the third time slot and that of the fourth time slot), and other normal time slots are set according to the switch point position.

When the time slots are configured with reference to FIG. 7(d), the signal transmission method in the TDD system is as follows accordingly: within the time length of the half-frame, the base station transmits signals in sequence in the first downlink normal time slot, in the second downlink normal time slot and in the downlink special time slot, while does not transmit any signal in the GP, and then, receives signals in the uplink special time slot, and receives or transmits signals in the remaining 6 time slots according to uplink and downlink setting, and the total time length of the downlink special time slot, the GP and the uplink special time slot is 2 times of the time length of one normal time slot.

When the time slots are configured with reference to FIG. 7(d), the duration of each OFDM symbol is $T_{symbol}$=66.67 us, and when a normal cyclic prefix is adopted, each normal time slot includes 14 uplink/downlink symbols, wherein the normal cyclic prefix is $T_{CP\text{-}normal}=4.69$ us; when an extended cyclic prefix is adopted, each normal time slot includes 12 uplink/downlink symbols, wherein the extended cyclic prefix is $T_{CP\text{-}extended}=16.67$ us, and the primary synchronization signal, the secondary synchronization signal or the combination of the two may be transmitted in the first or second OFDM symbol of $T_{DL}$, and the remaining time slots may be set in pairs to be uplink/downlink time slots according to different switch points, i.e., setting 2 or 4 uplink normal time slots first, and then setting an uplink-downlink switch point, and then setting 4 or 2 downlink normal time slots; or setting all the 6 normal time slots after the uplink special time slot as uplink normal time slots; or setting every remaining time slot to be an uplink/downlink time slot It will bring better effect if the remaining time slots are set in pairs to be uplink/downlink time slots.

If the proportion of downlink time slots and uplink time slots of a TD-SCDMA system is 2:5, the downlink special time slot, the GP and the uplink special time slot may be set in the following way:

when a normal cyclic prefix is adopted, $T_{DL}=356.8$ us, $T_{UL}=499.52$ us and $T_{GP}=142.72$ us;

wherein, the $T_{DL}$ includes 5 downlink OFDM symbols, the $T_{CP}$ includes 2 OFDM symbols and the $T_{UL}$ includes 7 uplink OFDM symbols.

When an extended cyclic prefix is adopted, $T_{DL}=417.6$ us, $T_{UL}=500.04$ us and $T_{GP}=83.34$ us;

wherein, the $T_{DL}$ includes 5 downlink OFDM symbols, the $T_{GP}$ includes 1 OFDM symbol and the $T_{UL}$ includes 6 uplink OFDM symbols.

If the proportion of downlink time slots and uplink time slots of a TD-SCDMA system is 3:4, the downlink special time slot, the GP and the uplink special time slot may be set in the following way:

when a normal cyclic prefix is adopted, $T_{DL}=71.36$ us, $T_{UL}=784.96$ us and $T_{GP}=142.72$ us;

wherein, the $T_{DL}$ includes 1 downlink OFDM symbol, the $T_{GP}$ includes 2 OFDM symbols and the $T_{UL}$ includes 11 uplink OFDM symbols.

When an extended cyclic prefix is adopted, $T_{DL}=83.34$ us, $T_{UL}=750.06$ us and $T_{GP}=166.68$ us wherein, the $T_{DL}$ includes 1 downlink OFDM symbol, the $T_{GP}$ includes 2 OFDM symbols and $T_{UL}$ includes 9 uplink OFDM symbols.

If the proportion of downlink time slots and uplink time slots of a TD-SCDMA system is 4:3, the downlink special time slot, the GP and the uplink special time slot may be set in the following way:

when a normal cyclic prefix is adopted, $T_{DL}=713.6$ us, $T_{UL}=142.72$ us and $T_{GP}=142.72$ us;

wherein, the $T_{DL}$ includes 10 downlink OFDM symbols, the $T_{GP}$ includes 2 OFDM symbols and the $T_{UL}$ includes 2 uplink OFDM symbols.

When an extended cyclic prefix is adopted, $T_{DL}=750.06$ us, $T_{UL}=166.68$ us and $T_{GP}=83.34$ us;

wherein, the $T_{DL}$ includes 9 downlink OFDM symbols, the $T_{GP}$ includes 1 OFDM symbol and the $T_{UL}$ includes 2 uplink OFDM symbols (among which one OFDM symbol is null).

If the proportion of downlink time slots and uplink time slots of a TD-SCDMA system is 5:2, the downlink special time slot, the GP and the uplink special time slot may be set in the following way:

when a normal cyclic prefix is adopted, $T_{DL}=428.64$ us, $T_{UL}=428.64$ us and $T_{GP}=142.72$ us;

wherein, the $T_{DL}$ includes 6 downlink OFDM symbols, the $T_{GP}$ includes 2 OFDM symbols and the $T_{UL}$ includes 6 uplink OFDM symbols, When an extended cyclic prefix is adopted, $T_{DL}=417.6$ us, $T_{UL}=417.6$ us and $T_{GP}=166.68$ us;

wherein, the $T_{DL}$ includes 5 downlink OFDM symbols, the $T_{GP}$ includes 2 OFDM symbols and the $T_{UL}$ includes 5 uplink OFDM symbols.

If the proportion of downlink time slots and uplink time slots of a TD-SCDMA system is 6:1, the downlink special time slot, the GP and the uplink special time slot may be set in the following way:

when a normal cyclic prefix is adopted, $T_{DL}=71.36$ us, $T_{UL}=784.96$ us and $T_{GP}=142.72$ us;

wherein, the $T_{DL}$ includes 1 downlink OFDM symbol, the $T_{GP}$ includes 2 OFDM symbols and the $T_{UL}$ includes 11 uplink OFDM symbols.

When an extended cyclic prefix is adopted, $T_{DL}=83.34$ us, $T_{UL}=750.06$ us and $T_{GP}=166.68$ us;

wherein, the $T_{DL}$ includes 1 downlink OFDM symbol, the $T_{GP}$ includes 2 OFDM symbols and the $T_{UL}$ includes 9 uplink OFDM symbols.

When a TDD system does not coexist with a TD-SCDMA system, the parameter setting of the TDD system signal transmission method provided in the present invention can be any one of the above 5 parameter settings in accordance with the application situation, or can be as follows:

when a normal cyclic prefix is adopted, $T_{DL}=71$ us, $T_{UL}=0$ us and $T_{GP}=929$ us;

wherein, the $T_{DL}$ includes 1 downlink OFDM symbol, the $T_{GP}$ includes 13 OFDM symbols and the $T_{UL}$ does not include any OFDM symbol.

When an extended cyclic prefix is adopted, $T_{DL}=83$ us, $T_{UL}=0$ us and $T_{GP}=917$ us;

wherein, the $T_{DL}$ includes 1 downlink OFDM symbol, the $T_{GP}$ includes 11 OFDM symbols and the $T_{UL}$ does not include any OFDM symbol.

Under the above two situations, the total time length of the downlink special time slot and the GP is equal to that of two normal time slots, namely the time length of each of other 8 normal time slots is $T_{slot}=500$ us. The uplink random access signal is transmitted in one or more consecutive uplink normal time slots. The synchronization signal is transmitted in the last two symbols of the first downlink time slot.

Specific parameter setting is not limited to the above-mentioned several manners, and more specific parameters can be further determined.

Figure 8A:
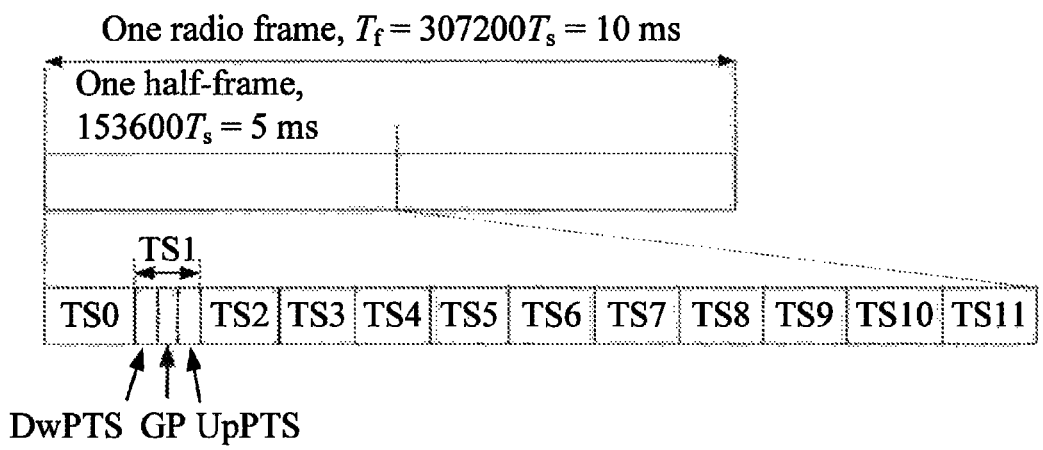
FIG. 8(a) is a diagram illustrating the structure of the first radio frame that is transmitted by adopting the method of the present invention when n is 12.

When n is 12, the 5 ms half-frame is divided into 12 time slots of equal length, and each time slot lasts for 416.67 us, being denoted as $TS_0 \sim TS_{11}$ respectively, and then one of the time slots thereof is taken as the downlink special time slot, the GP and the uplink special time slot, or two consecutive time slots are taken as the downlink special time slot, the GP and the uplink special time slot, or three consecutive time slots are taken as the downlink special time slot, the GP and the uplink special time slot;

the time slots thereof can be configured with reference to FIG. 8(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 8B:
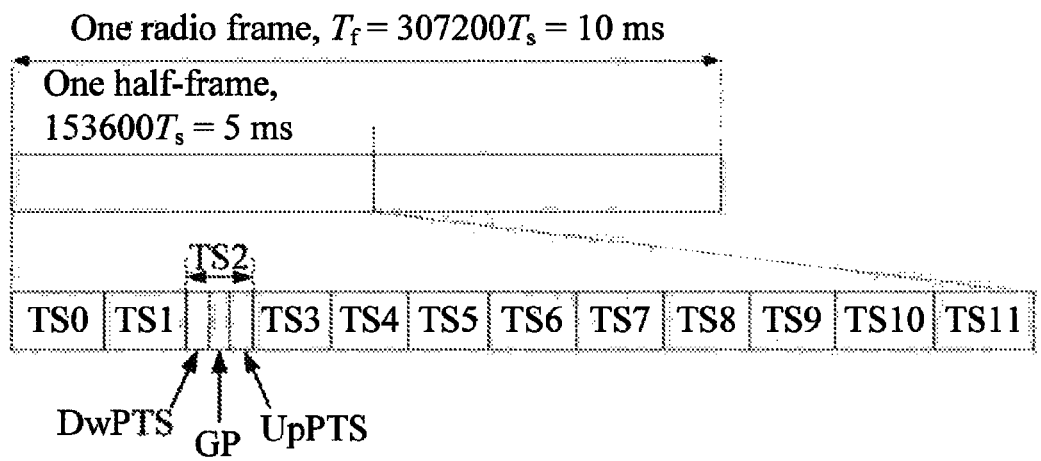
FIG. 8(b) is a diagram illustrating the structure of the second radio frame that is transmitted by adopting the method of the present invention when n is 12.

Or the time slots can be configured with reference to FIG. 8(b), wherein the first and second time slots are taken as downlink time slots, and the one afterwards is taken as the downlink special time slot, the GP and the uplink special time slot (these three parts occupy the time length of one normal time slot), and other normal time slots are set according to the switch point position.

Figure 8C:
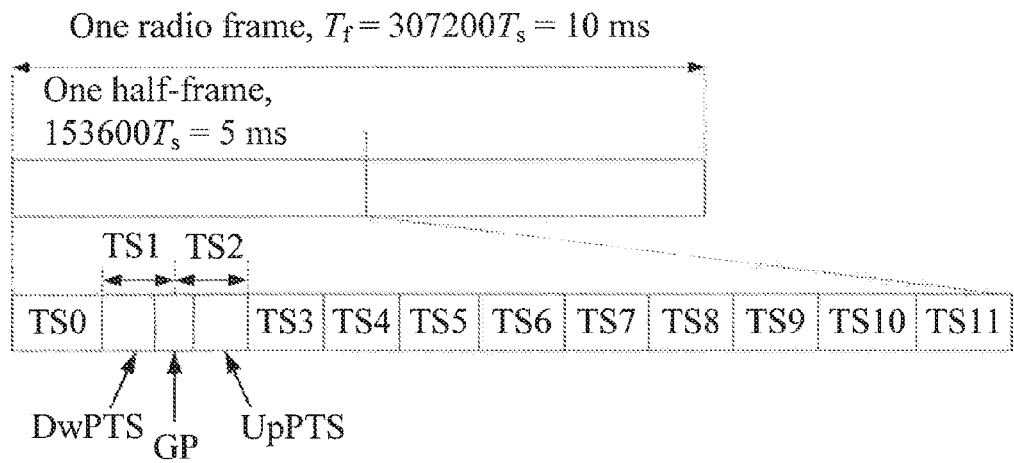
FIG. 8(c) is a diagram illustrating structure of the third radio frame that is transmitted by adopting the method of the present invention when n is 12.

Or the time slots can be configured with reference to FIG. 8(c), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 8D:
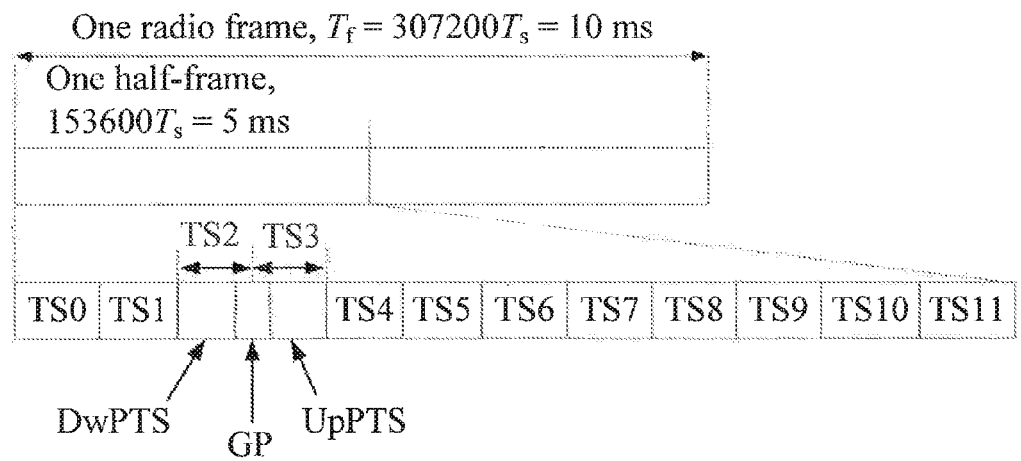
FIG. 8(d) is a diagram illustrating structure of the fourth radio frame that is transmitted by adopting the method of the present invention when n is 12.

Or the time slots can be configured with reference to FIG. 8(d), wherein the first and second time slots are taken as downlink time slots, and the two afterwards are taken as the downlink special time slot, the GP and the uplink special time slot (these three parts occupy the time length of the third time slot and that of the fourth time slot), and other normal time slots are set according to the switch point position.

Figure 8E:
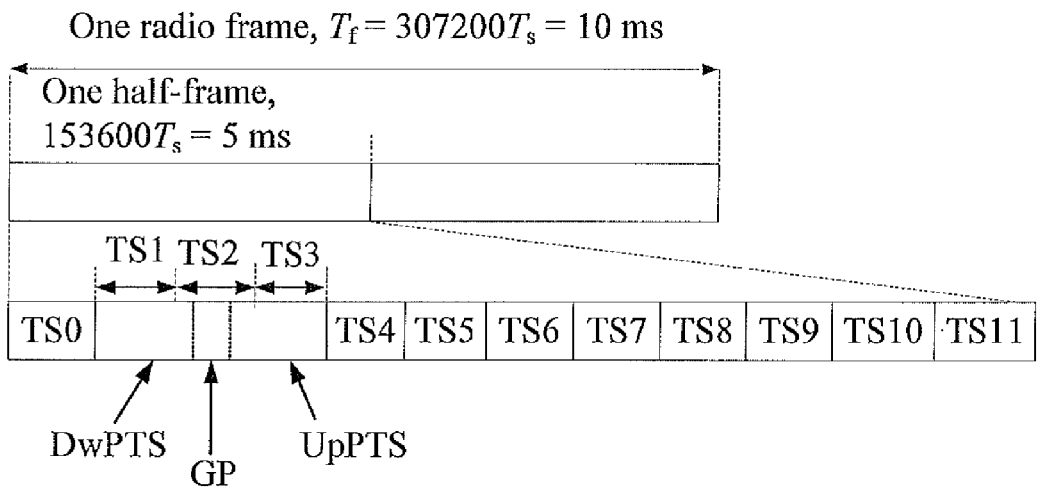
FIG. 8(e) is a diagram illustrating structure of the fifth radio frame that is transmitted by adopting the method of the present invention when n is 12.

Or the time slots can be configured with reference to FIG. 8(e), wherein the first time slot is taken as the downlink time slot, and the three afterwards are taken as the downlink special time slot, the GP and the uplink special time slot (these three parts occupy the time length of the second time slot, that of the third time slot and that of the fourth time slot), and other normal time slots are set according to the switch point position.

Figure 8F:
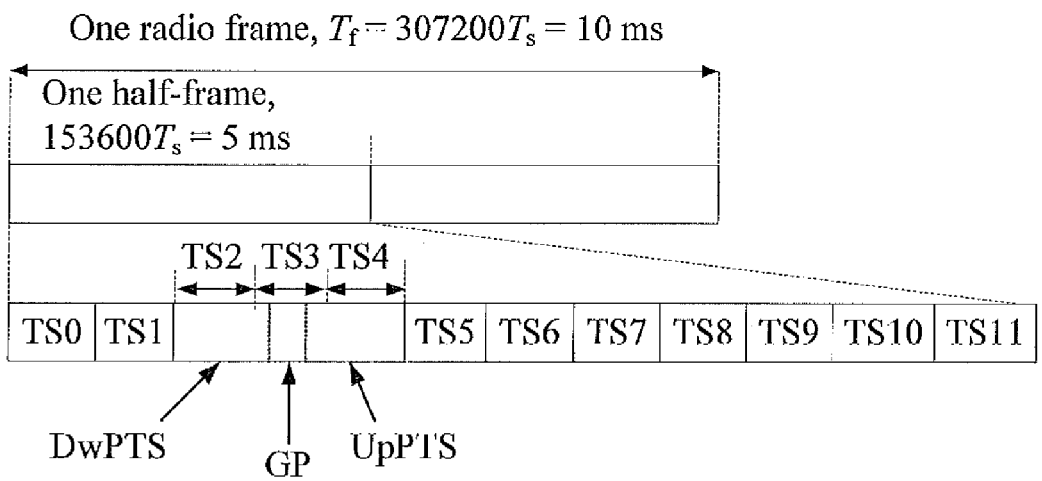
FIG. 8(f) is a diagram illustrating structure of the sixth radio frame that is transmitted by adopting the method of the present invention when n is 12.

Or the time slots can be configured with reference to FIG. 8(f), wherein the first and second time slots are taken as downlink time slots, and the three afterwards are taken as the downlink special time slot, the GP and the uplink special time slot (these three parts occupy the time length of the third time slot, that of the fourth time slot and that of the fifth time slot), and other normal time slots are set according to the switch point position.

Figure 8G:
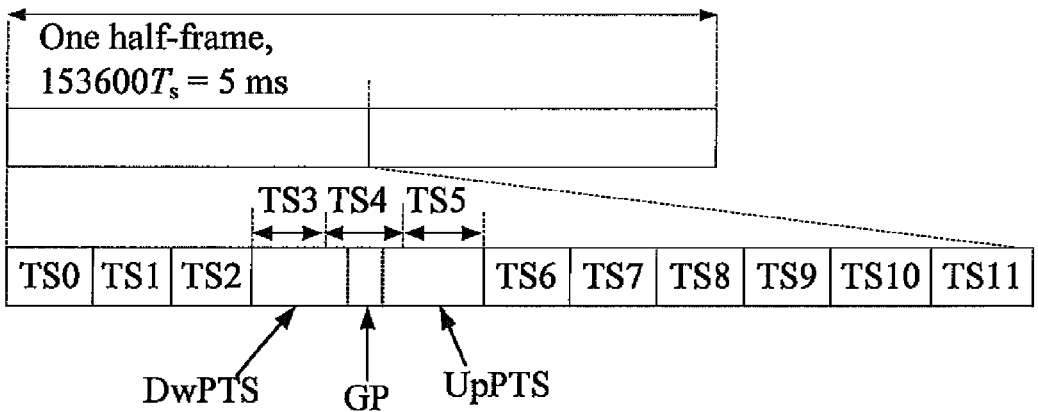
FIG. 8(g) is a diagram illustrating structure of the seventh radio frame that is transmitted by adopting the method of the present invention when n is 12.

Or the time slots can be configured with reference to FIG. 8(g), wherein the first, second and third time slots are taken as downlink time slots, and the three afterwards are taken as the downlink special time slot, the GP and the uplink special time slot (these three parts occupy the time length of the fourth time slot, that of the fifth time slot and that of the sixth time slot), and other normal time slots are set according to the switch point position.

Figure 9A:
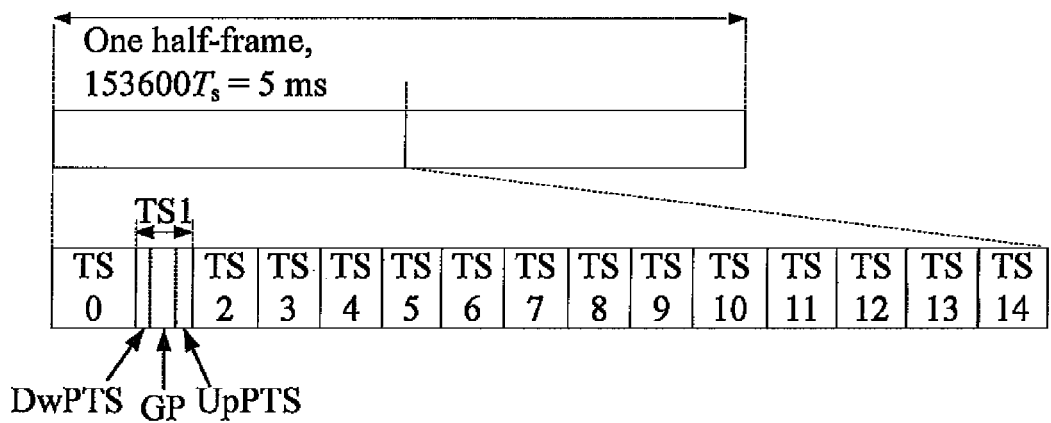
FIG. 9(a) is a diagram illustrating structure of the first radio frame that is transmitted by adopting the method of the present invention when n is 15.

When n is 15, the 5 ms half-frame is divided into 15 time slots of equal length, and each time slot lasts for 333.33 us, being denoted as $TS_0 \sim TS_{14}$ respectively, and then one of the time slots thereof is taken as the downlink special time slot, the GP and the uplink special time slot, or two consecutive time slots are taken as the downlink special time slot, the GP and the uplink special time slot, or three consecutive time slots are taken as the downlink special time slot, the GP and the uplink special time slot;

the time slots thereof can be configured with reference to FIG. 9(a), wherein the first time slot is taken as the downlink time slot, and the one afterwards is taken as the downlink special time slot, the GP and the uplink special time slot (these three parts occupy the time length of one normal time slot), and other normal time slots are set according to the switch point position.

Figure 9B:
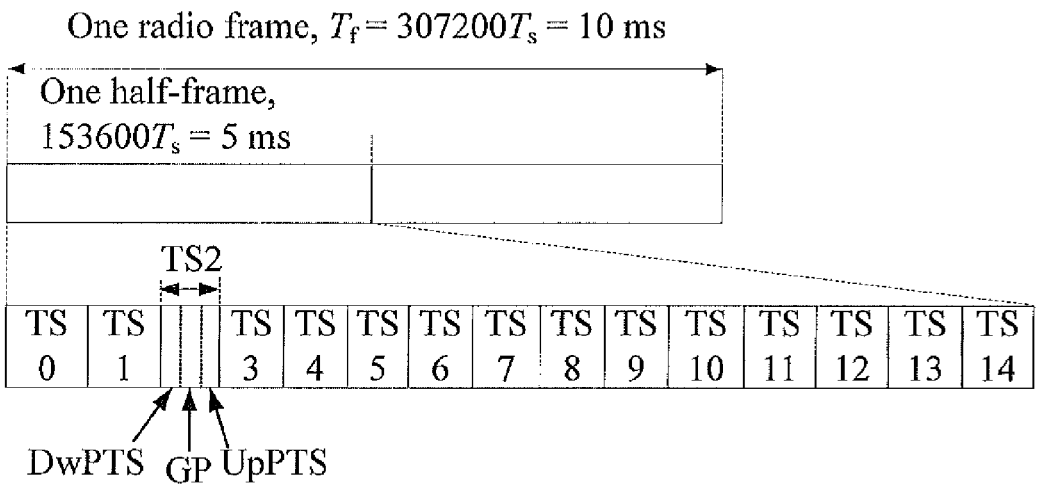
FIG. 9(b) is a diagram illustrating structure of the second radio frame that is transmitted by adopting the method of the present invention when n is 15.

Or the time slots can be configured with reference to FIG. 9(b), wherein the first and second time slots are taken as downlink time slots, and the one afterwards is taken as the downlink special time slot, the GP and the uplink special time slot (these three parts occupy the time length of one normal time slot), and other normal time slots are set according to the switch point position.

Figure 9C:
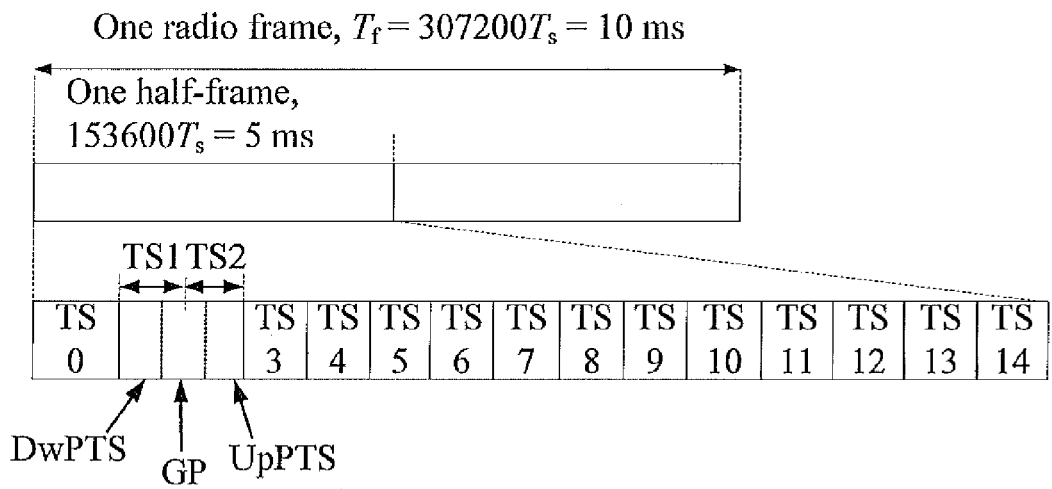
FIG. 9(c) is a diagram illustrating structure of the third radio frame that is transmitted by adopting the method of the present invention when n is 15.

Or the time slots can be configured with reference to FIG. 9(c), wherein the first time slot is taken as the downlink time slot, and the two afterwards are taken as the downlink special time slot, the GP and the uplink special time slot (these three parts occupy the time length of the second time slot and that of the third time slot), and other normal time slots are set according to the switch point position.

Figure 9D:
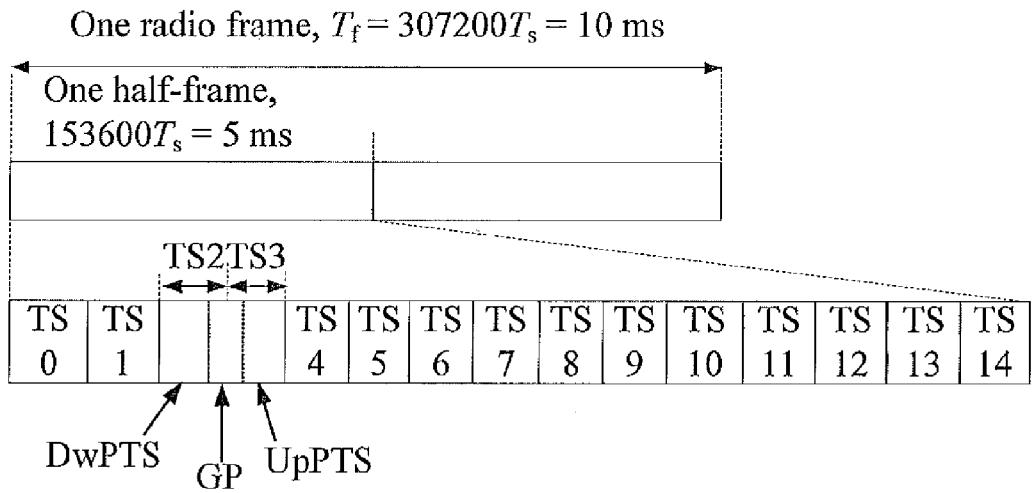
FIG. 9(d) is a diagram illustrating structure of the fourth radio frame that is transmitted by adopting the method of the present invention when n is 15.

Or the time slots can be configured with reference to FIG. 9(d), wherein the first and second time slots are taken as downlink time slots, and the two afterwards are taken as the downlink special time slot, the GP and the uplink special time slot (these three parts occupy the time length of the third time slot and that of the fourth time slot), and other normal time slots are set according to the switch point position.

Figure 9E:
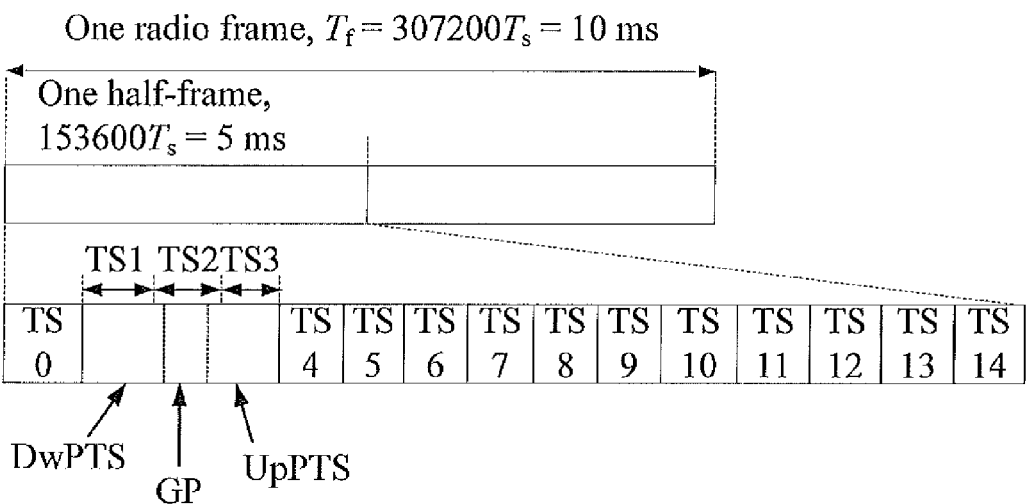
FIG. 9(e) is a diagram illustrating structure of the fifth radio frame that is transmitted by adopting the method of the present invention when n is 15.

Or the time slots can be configured with reference to FIG. 9(e), wherein the first time slot is taken as the downlink time slot, and the three afterwards are taken as the downlink special time slot, the GP and the uplink special time slot (these three parts occupy the time length of the second time slot, that of the third time slot and that of the fourth time slot), and other normal time slots are set according to the switch point position.

Figure 9F:
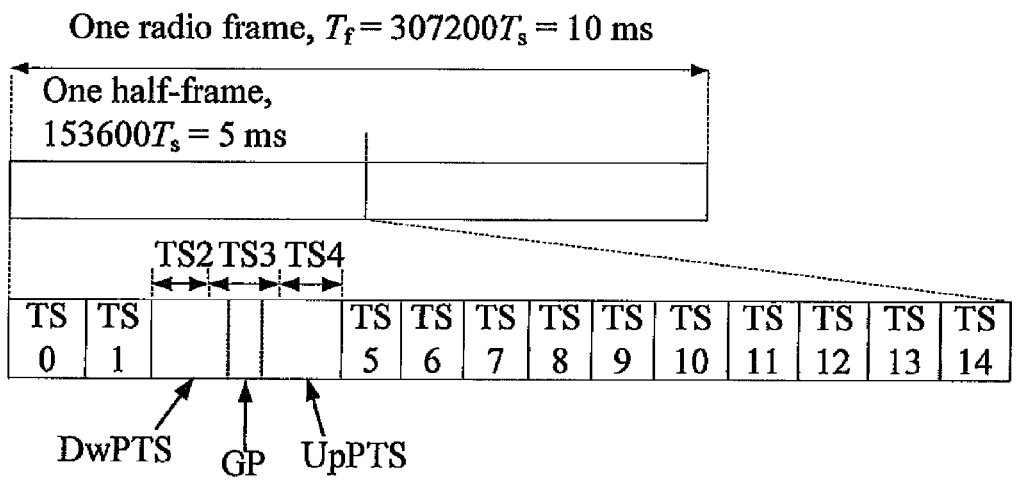
FIG. 9(f) is a diagram illustrating structure of the sixth radio frame that is transmitted by adopting the method of the present invention when n is 15.

Or the time slots can be configured with reference to FIG. 9(f), wherein the first and second time slots are taken as downlink time slots, and the three afterwards are taken as the downlink special time slot, the GP and the uplink special time slot (these three parts occupy the time length of the third time slot, that of the fourth time slot and that of the fifth time slot), and other normal time slots are set according to the switch point position.

Figure 9G:
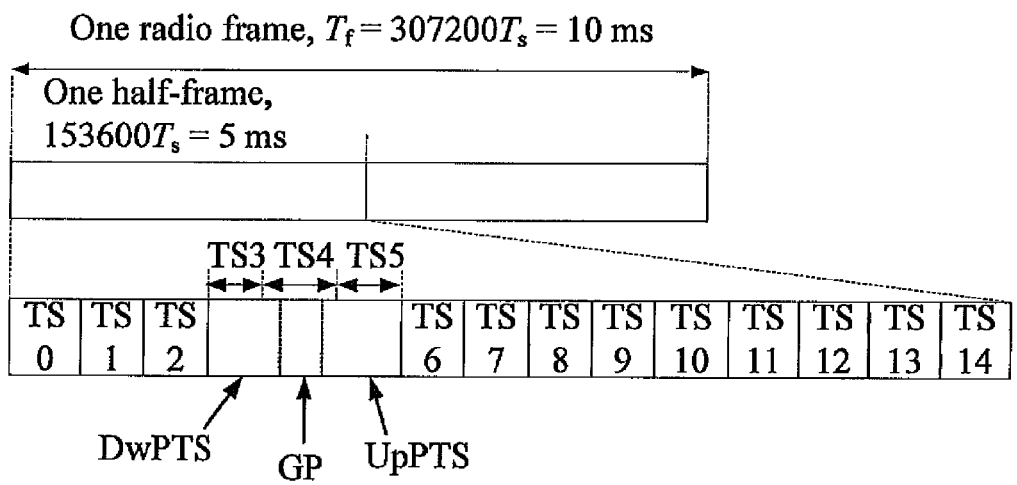
FIG. 9(g) is a diagram illustrating structure of the seventh radio frame that is transmitted by adopting the method of the present invention when n is 15.

Or the time slots can be configured with reference to FIG. 9(g), wherein the first, second and third time slots are taken as downlink time slots, and the three afterwards are taken as the downlink special time slot, the GP and the uplink special time slot (these three parts occupy the time length of the fourth time slot, that of the fifth time slot and that of the sixth time slot), and other normal time slots are set according to the switch point position.

It can be seen from the above embodiments that, the duration of a guard period (GP) can be set flexibly, e.g. increasing the duration of the GP by punching on OFDM symbols in the uplink/downlink time slot, wherein the growth granularity of the time length of the GP is symbol level. In addition, in comparison with synchronization channels, the position of the GP is not fixed with different time slot proportions. Furthermore, the synchronization signal is away from the uplink/downlink switch point, so it is guaranteed that even if the synchronization signal adopts power promotion, it will not bring much interference to uplink reception of other base stations. And since data can also be transmitted in other frequency bands of the downlink special time slot and the uplink special time slot, the problem of low utilization efficiency of the DwPTS and the UpPTS in the system is solved.

It should be understood by those skilled in the art that, the above descriptions are just preferred embodiments of the present invention, which are not used to limit implementation scopes of the present invention; any equivalent substitute and modification within the spirit of the present invention shall be included in the protection scope of the claims of the present invention.

For example, the symbols included in the uplink time slot and the downlink time slot can be OFDM symbols as described in the embodiments, or be other symbols; or the downlink time slot includes OFDM symbols, while the uplink time slot includes other symbols such as SC-FDMA; or the uplink time slot includes other symbols, while the downlink time slot includes OFDM symbol, etc.

INDUSTRIAL APPLICABILITY

1. The duration of a guard period (GP) can be set flexibly, e.g., increasing the duration of the GP by punching on OFDM symbols in an uplink/downlink time slot, wherein growth granularity of the time length of the GP is symbol level. In addition, in comparison with synchronization channels, the position of the GP is not fixed with different time slot proportions.

2. A synchronization signal is away from an uplink/downlink switch point, so it is guaranteed that even if the synchronization signal adopts power promotion, it will not bring much interference to uplink reception of other base stations.

3. Since data can also be transmitted in other frequency bands of a downlink special time slot and an uplink special time slot, the problem of low utilization efficiency of a DwPTS and an UpPTS in the previous system is solved.

What is claimed is:

1. A signal transmission method in a TDD system, comprising: within a time length of a half-frame of a radio frame, a base station transmitting signals in a downlink special time slot, thereafter not transmitting signals in a guard period (GP), and then receiving signals in an uplink special time slot; all time lengths of other uplink or downlink normal time slots for transmitting signals being equal; the total time length of the downlink special time slot, the guard period and the uplink special time slot being integer times of the time length of one uplink or downlink normal time slot; and wherein the number of the uplink and downlink normal time slots in the half-frame is 4, 5, 6, 8, 10, 11, 12, 13 or and within the time length of the half-frame base station transmits signals in order in the first downlink normal time slot, in the second downlink normal time slot and in the downlink special time slot, thereafter does not transmit any signal in the GP, and then, receives signals in the uplink special time slot, and receives or transmits signals in the remaining 6 time slots according to uplink and downlink setting and the total time length of the downlink special time slot, the GP and the uplink special time slot is 2 times of the time length of one normal time slot.

2. The method according to claim 1, wherein:

a primary synchronization (P-SCH) signal is transmitted in the first symbol of the downlink special time slot, and a secondary synchronization (S-SCH) signal is transmitted in the last symbol of the previous downlink time slot adjacent to the downlink special time slot; or the P-SCH signal and the S-SCH signal are transmitted in the first two symbols of the downlink special time slot; or the P-SCH signal and the S-SCH signal are transmitted in the last two symbols of the first downlink time slot in the half-frame.

3. The method according to claim 1, wherein:

an uplink random access signal is transmitted in one or more consecutive time slots of the uplink special time slot and the uplink normal time slot.

4. The method according to claim 3, wherein:

when a short random access channel (RACH) is adopted, the uplink random access signal is transmitted in the first two symbols of the uplink special time slot, or in the last two symbols of the uplink special time slot, or in start positions of other uplink time slots.

5. The method according to claim 1, wherein:

the time length of the downlink special time slot, that of the guard period (GP) and that of the uplink special time slot are set according to application occasions, and on the occasion when it is required to support larger coverage, the GP increases the length by occupying part of the time length of the downlink special time slot and that of the uplink special time slot, wherein growth granularity of the time length of the GP is symbol level, namely the time length of the GP being set is longer than that under the occasion which is only required to support a smaller coverage.

6. The method according to claim 1, wherein:

the number of the uplink and downlink normal time slots in the half-frame is 4, and the total time length of the downlink special time slot, the GP and the uplink special time slot is 1 or 2 times of the time length of one normal time slot; or the number of the uplink and downlink normal time slots in the half-frame is 5, and the total time length of the downlink special time slot, the GP and the uplink special time slot is 1 or 2 times of the time length of one normal time slot; or the number of the uplink and downlink normal time slots in the half-frame is 6, and the total time length of the downlink special time slot, the GP and the uplink special time slot is 1 or 2 times of the time length of one normal time slot; or the number of the uplink and downlink normal time slots in the half-frame is 7, and the total time length of the downlink special time slot, the GP and the uplink special time slot is 1 or 2 times of the time length of one normal time slot; or the number of the uplink and downlink normal time slots in the half-frame is 8, and the total time length of the downlink special time slot, the GP and the uplink special time slot is 1 or 2 times of the time length of one normal time slot; or the number of the uplink and downlink normal time slots in the half-frame is 10, and the total time length of the downlink special time slot, the GP and the uplink special time slot is 2 times of the time length of one normal time slot; or the number of the uplink and downlink normal time slots in the half-frame is 11, and the total time length of the downlink special time slot, the GP and the uplink special time slot is 1 time of the time length of one normal time slot; or the number of the uplink and downlink normal time slots in the half-frame is 12, and the total time length of the downlink special time slot, the GP and the uplink special time slot is 3 times of the time length of one normal time slot; or the number of the uplink and downlink normal time slots in the half-frame is 13, and the total time length of the downlink special time slot, the GP and the uplink special time slot is 2 times of the time length of one normal time slot; or the number of the uplink and downlink normal time slots in the half-frame is 14, and the total time length of the downlink special time slot, the GP and the uplink special time slot is 1 time of the time length of one normal time slot.

7. The method according to claim 1, wherein when the TDD system coexists with a TD-SC DMA system, if the proportion of downlink time slots and uplink time slots of the TD-SCDMA system is 2:5, then:

if a normal cyclic prefix is adopted, the downlink special time slot includes 5 downlink symbols, and the time length is $T_{DL}$=356.8 us; the time length of the GP is $T_{GP}$=142.72 us; the uplink special time slot includes 7 uplink symbols, and the time length is $T_{UL}$=499.52 us;

if an extended cyclic prefix is adopted, the downlink special time slot includes 5 downlink symbols, and the time length is $T_{DL}$=417.6 us; the time length of the GP is $T_{GP}$=83.34 us; the uplink special time slot includes 6 uplink symbols, and the time length is $T_{UL}$=500.04 us;

if the proportion of downlink time slots and uplink time slots of the TD-SCDMA system is 3:4, then:

if a normal cyclic prefix is adopted, the downlink special time slot includes 1 downlink symbol, and the time length is $T_{DL}$=71.36 us; the time length of the GP is $T_{GP}$=142.72 us; the uplink special time slot includes 11 uplink symbols, and the time length is $T_{UL}$=784.96 us;

if an extended cyclic prefix is adopted, the downlink special time slot includes 1 downlink symbol, and the time length is $T_{DL}$=83.34 us; the time length of the GP is $T_{GP}$=166.68 us; the uplink special time slot includes 9 uplink symbols, and the time length is $T_{UL}$=750.06 us;

if the proportion of downlink time slots and uplink time slots of the TD-SCDMA system is 4:3, then:

if a normal cyclic prefix is adopted, the downlink special time slot includes 10 downlink symbols, and the time length is $T_{DL}$=713.6 us; the time length of the GP is $T_{GP}$=142.72 us; the uplink special time slot includes 2 uplink symbols, and the time length is $T_{UL}$=142.72 us;

if an extended cyclic prefix is adopted, the downlink special time slot includes 9 downlink symbols, and the time length is $T_{DL}$=750.06 us; the time length of the GP is $T_{GP}$=83.34 us; the uplink special time slot includes 2 uplink symbols, and the time length is $T_{UL}$=166.68 us;

if the proportion of downlink time slots and uplink time slots of the TD-SCDMA system is 5:2, then:

if a normal cyclic prefix is adopted, the downlink special time slot includes 6 downlink symbols, and the time length is $T_{DL}$=428.64 us; the time length of the GP is $T_{GP}$=142.72 us; the uplink special time slot includes 6 uplink symbols, and the time length is $T_{UL}$=428.64 us;

if an extended cyclic prefix is adopted, the downlink special time slot includes 5 downlink symbols, and the time length is $T_{DL}$=417.6 us; the time length of the GP is $T_{GP}$=166.68 us; the uplink special time slot includes 5 uplink symbols, and the time length is $T_{UL}$=417.6 us;

if the proportion of downlink time slots and uplink time slots of the TD-SCDMA system is 6:1, then:

if a normal cyclic prefix is adopted, the downlink special time slot includes 1 downlink symbol, and the time length is $T_{DL}$=71.36 us; the time length of the GP is $T_{GP}$=142.72 us; the uplink special time slot includes 11 uplink symbols, and the time length is $T_{UL}$=784.96 us;

if an extended cyclic prefix is adopted, the downlink special time slot includes 1 downlink symbol, and the time length is $T_{DL}$=83.34 us; the time length of the GP is $T_{GP}$=166.68 us; the uplink special time slot includes 9 uplink symbols, and the time length is $T_{UL}$=750.06 us;

or the parameter settings of the downlink special time slot, the GP and the uplink special time slot that correspond to the above-mentioned various proportions are applied when the TDD system and the TD-SCDMA system do not coexist.

8. The method according to claim 1, wherein when the TDD system does, not coexist with a TD-SCDMA system:

if a normal cyclic prefix is adopted, the time length of the downlink special time slot is $T_{DL}$=71 us, in which 1 downlink symbol is included; the time length of the GP is $T_{GP}$=929 us, equaling to the time length of 13 symbols; the time length of the uplink special time slot is $T_{UL}$=0 us; or if an extended cyclic prefix is adopted, the time length of the downlink special time slot is $T_{DL}$=83 us, in which 1 downlink symbol is included; the time length of the GP is $T_{GP}$=917 us, equaling to the time length of 11 symbols; the time length of the uplink special time slot is $T_{UL}$=0 us;

under the above two circumstances, the total time length of the downlink special time slot and the GP equals to the time length of two normal time slots, and the uplink random access signal is transmitted in one or more consecutive uplink normal time slots.

9. The method according to claim 2, wherein the symbols included in the uplink time slot and/or downlink time slot are Orthogonal Frequency Division Multiplexing (OFDM) symbols.

10. A base station for transmitting signals within a structure adopted in a TDD system, in which a radio frame including two half-frames of equal length, wherein each of the half-frames further including one downlink special time slot, one guard period (GP), one uplink special time slot, and a plurality of uplink and downlink normal time slots of equal length, and the total time length of the downlink special time slot, the guard period and the uplink special time slot being integer times of the time length of one uplink or downlink normal time slot;

wherein the base station transmits signals in a downlink special time slot of the frame structure, thereafter no transmitting signals in a guard period of the frame structure, and then receiving signals in an uplink special time slot of the frame structure; and wherein the number of the uplink and downlink normal time slots in the half-frame is 4, 5, 6, 8, 10, 11, 12, 13 or 14; and the half-frame includes two downlink normal time slots, one downlink special time slot, the GP, one uplink special time slot, and 6 uplink and/or downlink normal time slots in sequence, and the total time length of the downlink special time slot, the GP and the uplink special time slot is 2 times of the time length of one normal time slot.

11. The frame structure according to claim 10, wherein:

the number of the uplink and downlink normal time slots in the half-frame is 4, and the total time length of the downlink special time slot, the GP and the uplink special time slot is 1 or 2 times of the time length of one normal time slot; or the number of the uplink and downlink normal time slots in the half-frame is 5, and the total time length of the downlink special time slot, the GP and the uplink special time slot is 1 or 2 times of the time length of one normal time slot; or the number of the uplink and downlink normal time slots in the half-frame is 6, and the total time length of the downlink special time slot, the GP and the uplink special time slot is 1 or 2 times of the time length of one normal time slot; or the number of the uplink and downlink normal time slots in the half-frame is 7, and the total time length of the downlink special time slot, the GP and the uplink special time slot is 1 or 2 times of the time length of one normal time slot; or the number of the uplink and downlink normal time slots in the half-frame is 8, and the total time length of the downlink special time slot, the GP and the uplink special time slot is 1 or 2 times of the time length of one normal time slot; or the number of the uplink and downlink normal time slots in the half-frame is 10, and the total time length of the downlink special time slot, the GP and the uplink special time slot is 2 times of the time length of one normal time slot; or the number of the uplink and downlink normal time slots in the half-frame is 11, and the total time length of the downlink special time slot, the GP and the uplink special time slot is 1 time of the time length of one normal time slot; or the number of the uplink and downlink normal time slots in the half-frame is 12, and the total time length of the downlink special time slot, the GP and the uplink special time slot is 3 times of the time length of one normal time slot; or the number of the uplink and downlink normal time slots in the half-frame is 13, and the total time length of the downlink special time slot, the GP and the uplink special time slot is 2 times of the time length of one normal time slot; or the number of the uplink and downlink normal time slots in the half-frame is 14, and the total time length of the downlink special time slot, the GP and the uplink special time slot is 1 time of the time length of one normal time slot.

12. The frame structure according to claim 10, wherein:

if the downlink special time slot and the uplink special time slot adopt a normal cyclic prefix, the downlink special time slot includes 5 downlink symbols, and the time length is $T_{DL}$=356.8 us; the GP includes 2 symbols, and the time length is $T_{GP}$=142.72 us; the uplink special time slot includes 7 uplink symbols, and the time length is $T_{UL}$=499.52 us; or if the downlink special time slot and the uplink special time slot adopt an extended cyclic prefix, the downlink special time slot includes 5 downlink symbols, and the time length is $T_{DL}$=417.6 us; the GP includes 1 symbol, and the time length is $T_{GP}$=83.34 us; the uplink special time slot includes 6 uplink symbols, and the time length is $T_{UL}$=500.04 us; or if the downlink special time slot and the uplink special time slot adopt a normal cyclic prefix, the downlink special time slot includes 1 downlink symbol, and the time length is $T_{DL}$=71.36 us; the GP includes 2 symbols, and the time length is $T_{GP}$=142.72 us; the uplink special time slot includes 11 uplink symbols, and the time length is $T_{UL}$=784.96 us; or if the downlink special time slot and the uplink special time slot adopt an extended cyclic prefix, the downlink special time slot includes 1 downlink symbol, and the time length is $T_{DL}$=83.34; the GP includes 2 symbols, and the time length is $T_{GP}$=166.68 us; the uplink special time slot includes 9 uplink symbols, and the time length is $T_{UL}$=750.06 us; or if the downlink special time slot and the uplink special time slot adopt a normal cyclic prefix, the downlink special time slot includes 10 downlink symbols, and the time length is $T_{DL}$=713.6 us; the GP includes 2 symbols, and the time length is $T_{GP}$=142.72 us; the uplink special time slot includes 2 uplink symbols, and the time length is $T_{UL}$=142.72 us; or if the downlink special time slot and the uplink special time slot adopt an extended cyclic prefix, the downlink special time slot includes 9 downlink symbols, and the time length is $T_{DL}$=750.06 us; the GP includes 1 symbol, and the time length is $T_{GP}$=83.34 us; the uplink special time slot includes 2 uplink symbols, and the time length is $T_{UL}$=166.68 us; or if the downlink special time slot and the uplink special time slot adopt a normal cyclic prefix, the downlink special time slot includes 6 downlink symbols, and the time length is $T_{DL}$=428.64 us, the GP includes 2 symbols, and the time length is $T_{GP}$=142.72 us; the uplink special time slot includes 6 uplink symbols, and the time length is $T_{UL}$=428.64 us; or if the downlink special time slot and the uplink special time slot adopt an extended cyclic prefix, the downlink special time slot includes 5 downlink symbols, and the time length is $T_{DL}$=417.6 us; the GP includes 2 symbols, and the time length is $T_{GP}$=166.68 us; the uplink special time slot includes 5 uplink symbols, and the time length is $T_{UL}$=417.6 us; or if the downlink special time slot and the uplink special time slot adopt a normal cyclic prefix, the downlink special time slot includes 1 downlink symbol, and the time length is $T_{DL}$=71.36 us; the GP includes 2 symbols, and the time length is $T_{GP}$=142.72 us; the uplink special time slot includes 11 uplink symbols, and the time length is $T_{DL}$=784.96 us; or if the downlink special time slot and the uplink special time slot adopt an extended cyclic prefix, the downlink special time slot includes 1 downlink symbol, and the time length is $T_{DL}$=83.34 us; the GP includes 2 symbols, and the time length is $T_{GP}$=166.68 us; the uplink special time slot includes 9 uplink symbols, and the time length is $T_{UL}$=750.06 us.

13. The frame structure according to claim 10, wherein:

as to the 6 normal time slots following the uplink special time slot, 2 or 4 uplink normal time slots are set first, then one uplink-downlink switch point is set, and then 4 or 2 downlink normal time slots are set; or all the 6 normal time slots following the uplink special time slot are set to be uplink normal time slots.

14. The frame structure according to claim 10, wherein:

a primary synchronization (P-SCH) signal is transmitted in the first symbol of the downlink special time slot, while a secondary synchronization (S-SCH) signal is transmitted in the last symbol of the downlink time slot that is adjacent to the downlink special time slot, or the P-SCH signal and the S-SCH signal are transmitted in the first two symbols of the downlink special time slot, or the P-SCH signal and the S-SCH signal are transmitted in the last two symbols of the first downlink time slot.

15. The frame structure according to claim 10, wherein:

an uplink random access signal is transmitted in one or more consecutive time slots of the uplink special time slot and the uplink normal time slot, when a short random access channel (RACH) is adopted, the uplink random access signal is transmitted in the first two symbols of the uplink special time slot, or in the last two symbols of the uplink special time slot, or in start positions of other uplink time slots.

16. The frame structure according to claim 12, wherein the symbols included in the uplink time slot and/or downlink time slot are Orthogonal Frequency Division Multiplexing (OFDM) symbols.

17. The method according to claim 4, wherein the symbols included in the uplink time slot and/or downlink time slot are Orthogonal Frequency Division Multiplexing (OFDM) symbols.

18. The method according to claim 5, wherein the symbols included in the uplink time slot and/or downlink time slot are Orthogonal Frequency Division Multiplexing (OFDM) symbols.

19. The method according to claim 7, wherein the symbols included in the uplink time slot and/or downlink time slot are Orthogonal Frequency Division Multiplexing (OFDM) symbols.

20. The method according to claim 8, wherein the symbols included in the uplink time slot and/or downlink time slot are Orthogonal Frequency Division Multiplexing (OFDM) symbols.

21. The frame structure according to claim 14, wherein the symbols included in the uplink time slot and/or downlink time slot are Orthogonal Frequency Division Multiplexing (OFDM) symbols.

22. The frame structure according to claim 15, wherein the symbols included in the uplink time slot and/or downlink time slot are Orthogonal Frequency Division Multiplexing (OFDM) symbols.

* * * * *

UNITED STATES PATENT AND TRADEMARK OFFICE
CERTIFICATE OF CORRECTION

PATENT NO.         : 9,001,707 B2
APPLICATION NO.    : 12/674336
DATED              : April 7, 2015
INVENTOR(S)        : Bo Dai et al.

It is certified that error appears in the above-identified patent and that said Letters Patent is hereby corrected as shown below:

Claims

Column 17, lines number 25-26, Claim 1 "wherein the number of the uplink and downlink normal time slots in the half-frame is 4, 5, 6, 8, 10, 11, 12, 13 or"

should read

"wherein the number of the uplink and downlink normal time slots in the half-frame is 4, 5, 6, 8, 10, 11, 12, 13 or 14"

Signed and Sealed this
Twenty-ninth Day of March, 2016

Michelle K. Lee
*Director of the United States Patent and Trademark Office*